United States Patent
Lee

(10) Patent No.: US 9,614,417 B2
(45) Date of Patent: Apr. 4, 2017

(54) AXIAL FLUX PERMANENT MAGNET MOTOR

(71) Applicant: Hyundai Mobis Co., Ltd., Seoul (KR)

(72) Inventor: Sang Han Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 136 days.

(21) Appl. No.: 13/973,265

(22) Filed: Aug. 22, 2013

(65) Prior Publication Data

US 2014/0292117 A1    Oct. 2, 2014

(30) Foreign Application Priority Data

Mar. 28, 2013    (KR) .................. 10-2013-0033710

(51) Int. Cl.
| | |
|---|---|
| *H02K 1/20* | (2006.01) |
| *H02K 5/20* | (2006.01) |
| *H02K 9/19* | (2006.01) |
| *H02K 1/27* | (2006.01) |

(52) U.S. Cl.
CPC ............. *H02K 9/19* (2013.01); *H02K 1/20* (2013.01); *H02K 5/20* (2013.01); *H02K 1/2793* (2013.01)

(58) Field of Classification Search
CPC .. H02K 1/17; H02K 1/18; H02K 1/28; H02K 3/24; H02K 5/08; H02K 5/20; H02K 9/00; H02K 9/19; H02K 9/193; H02K 9/22; H02K 16/00; H02K 2203/12; H02K 1/2793; H02K 21/026; H02K 21/24; H02K 37/125; H02K 49/108; H02K 9/16

USPC ............. 310/12.23, 49.33, 54, 64, 112, 114, 310/154.13, 179, 156.32, 52, 58, 59, 310/49.32

See application file for complete search history.

(56) References Cited

U.S. PATENT DOCUMENTS

| | | | | |
|---|---|---|---|---|
| 5,892,307 | A * | 4/1999 | Pavlovich | ................ H02K 1/32 310/156.36 |
| 6,720,688 | B1 * | 4/2004 | Schiller | ................ H02K 1/2793 310/266 |
| 6,943,471 | B2 * | 9/2005 | Toyokawa | ........... H02K 5/1675 310/67 R |
| 6,943,473 | B2 * | 9/2005 | Furuse | ................... H02K 16/02 310/112 |
| 7,355,311 | B2 * | 4/2008 | Shimizu | ................. H02K 1/182 310/156.37 |

(Continued)

FOREIGN PATENT DOCUMENTS

KR    10-2011-0127198 A    11/2011

*Primary Examiner* — Quyen Leung
*Assistant Examiner* — Minki Chang
(74) *Attorney, Agent, or Firm* — NSIP Law

(57) ABSTRACT

According to an aspect of the present invention, an axial flux permanent magnet motor includes: a stator assembly configured to produce magnetic flux in a rotating axis direction; and a housing assembly including a motor housing in which the stator assembly is accommodated, in which a first cooling groove is formed in an inner circumferential surface of the motor housing to be predeterminedly and circumferentially extended, a second cooling groove, which corresponds to the first cooling groove, is formed in an outer circumferential surface of the stator assembly so as to be predeterminedly and circumferentially extended, and the first and second cooling grooves meet together to form a cooling flow path for a flow of a coolant.

12 Claims, 41 Drawing Sheets

(56) References Cited

U.S. PATENT DOCUMENTS

| | | | |
|---|---|---|---|
| 7,687,969 B2* | 3/2010 | Kim | D06F 37/304 310/180 |
| 2005/0035676 A1* | 2/2005 | Rahman | B60K 6/26 310/83 |
| 2009/0184591 A1* | 7/2009 | Hoshino | H02K 3/24 310/54 |
| 2011/0011203 A1* | 1/2011 | Yamamoto | B60K 7/0007 74/606 A |
| 2011/0241460 A1* | 10/2011 | Mebarki et al. | 310/64 |
| 2011/0309694 A1* | 12/2011 | Woolmer | H02K 21/24 310/44 |
| 2012/0013217 A1* | 1/2012 | Bradfield | H02K 1/12 310/216.106 |
| 2012/0139370 A1* | 6/2012 | Pal | H02K 5/20 310/54 |

* cited by examiner (a)

(b)

(a)

(b)

(c)

(d)

(a)

(b)

(a)

(b)

(a)

(b)

(a)          (b)

(a)

(b)

(a)

(b)

AXIAL FLUX PERMANENT MAGNET MOTOR

CROSS-REFERENCE TO RELATED APPLICATION

This application claims priority to and the benefit of Korean Patent Application No. 10-2013-0033710 filed in the Korean Intellectual Property Office on Mar. 28, 2013, the entire contents of which are incorporated herein by reference.

TECHNICAL FIELD

The present invention relates to an axial flux permanent magnet motor.

BACKGROUND OF THE INVENTION

In general, a motor refers to a device that converts electrical energy into mechanical energy to obtain a rotational force, and is being widely utilized in various industrial fields including electric home appliances and industrial machines. The motor has a main configuration including a stator fixed to a housing or a casing and having a coil, which is wound therein so as to produce a rotating magnetic field when electric power is supplied thereto, and a rotor which is rotatably installed in the stator by a shaft. A rotational torque is generated by interaction between the rotor and a magnetic flux generated by the stator.

Meanwhile, in recent years, active research and development is being conducted on another type of automobile, namely a hybrid automobile or an electric automobile which is more environmentally friendly and has better fuel efficiency than an automobile using a combustion type engine. The hybrid automobile is driven by two types of power sources, namely, an existing combustion type engine and an electric drive motor, and the electric automobile is driven by the electric drive motor. Therefore, the automobiles are positioned as an alternative, next generation automobile to reduce environmental pollution due to exhaust gas and increase fuel efficiency. The motor in the hybrid automobile or the electric automobile is considered as a core component that determines overall vehicle performance. Development of a compact motor for producing a high output has become a new topic with respect to the hybrid automobile, or the like.

SUMMARY OF THE INVENTION

The present invention has been made in an effort to provide an axial flux permanent magnet motor capable of shortening a radial length of a motor.

An exemplary embodiment of the present invention provides an axial flux permanent magnet motor including: a stator assembly configured to produce magnetic flux in a rotating axis direction; and a housing assembly including a motor housing in which the stator assembly is accommodated, in which a first cooling groove is formed in an inner circumferential surface of the motor housing to be predeterminedly and circumferentially extended, a second cooling groove, which corresponds to the first cooling groove, is formed in an outer circumferential surface of the stator assembly so as to be predeterminedly and circumferentially extended, and the first and second cooling grooves meet together to form a cooling flow path for a flow of a coolant.

According to the exemplary embodiments of the present invention, the first cooling groove provided in the motor housing and the second cooling groove provided in the stator assembly meet together to form a single cooling flow path, thereby reducing a thickness of the motor housing, and shortening a radial length of the motor.

DETAILED DESCRIPTION OF THE EMBODIMENTS

Hereinafter, exemplary embodiments of the present invention will be described with reference to the accompanying drawings. However, it is noted that the following exemplary embodiments are provided for better understanding of the present invention, and the scope of the present invention is not limited to the following exemplary embodiments. In addition, the following exemplary embodiments are provided to more completely explain the present invention to a person having an ordinary skill in the art, and detailed descriptions regarding publicly known constituent elements, which may obscure the technical gist of the present invention, will be omitted.

Figure 1:
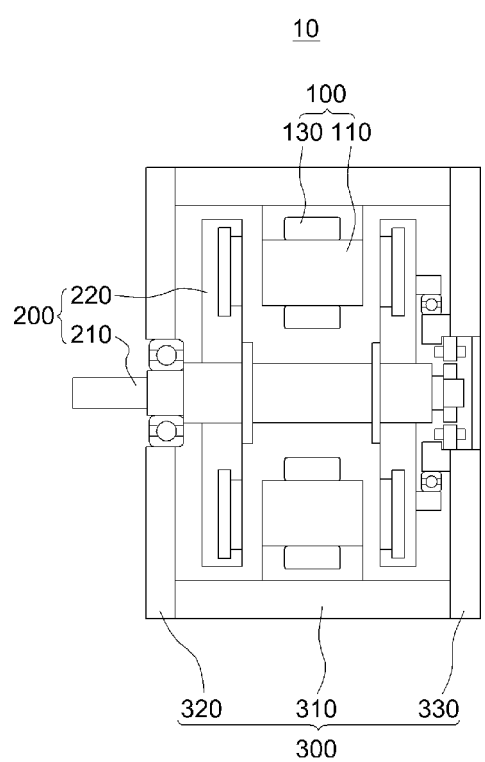
FIG. 1 is a conceptual view of an axial flux permanent magnet motor according to an exemplary embodiment of the present invention.

FIG. 1 is a conceptual view of an axial flux permanent magnet motor according to an exemplary embodiment of the present invention.

Referring to FIG. 1, an axial flux permanent magnet motor 10 may include a stator assembly 100 configured to generate magnetic flux to form a rotating field, a rotor assembly 200 configured to interact in a rotating magnetic field so as to be rotated, and a housing assembly 300 in which the stator assembly 100 and the rotor assembly 200 are mounted.

The stator assembly 100 may include a stator core 110, and a coil 130. The stator core 110 supports the wound coil 130, and may provide a movement path of the magnetic flux. The coil 130 may be wound on the stator core 110. The coil 130 may be connected to a power source unit so as to be supplied with a current, and generates magnetic flux for forming a rotating field by the current.

The rotor assembly 200 may include a shaft 210, and a pair of rotating plate assemblies 220 that is provided at front and rear sides of the shaft 210. The shaft 210 may be formed to be rotatable about an axis in a longitudinal direction or in a front and rear direction. The pair of rotating plate assemblies 220 may be disposed to interpose the stator assembly 100 therebetween and face each other at the front and rear sides of the shaft 210. The rotating plate assemblies 220 are provided with a magnetic body, and cause an interaction in a rotating field to generate rotating drive force.

The housing assembly 300 may include a motor housing 310 having an inner side in which the stator assembly 100 and the like are accommodated, and a front cover 320 and a rear cover 330 that are fastened to front and rear surfaces of the motor housing 310, respectively. The motor housing 310 fixes and supports the stator assembly 100, and provides a mounting space for disposing the rotor assembly 200 and the like. The front and rear surfaces of the motor housing 310 may be shielded by the front cover 320 and the rear cover 330, respectively. The front cover 320 and the rear cover 330 shield the mounting space inside the motor housing 310 from the outside, and rotatably support the rotor assembly 200 using a bearing or the like.

Figure 2:
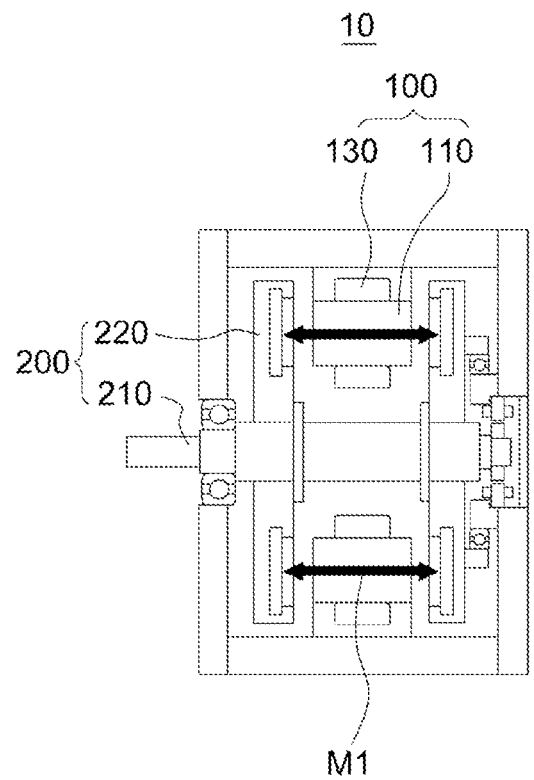
FIG. 2 is a conceptual view for comparing an axial flux permanent magnet motor with a radial flux permanent magnet motor.
Figure 2:
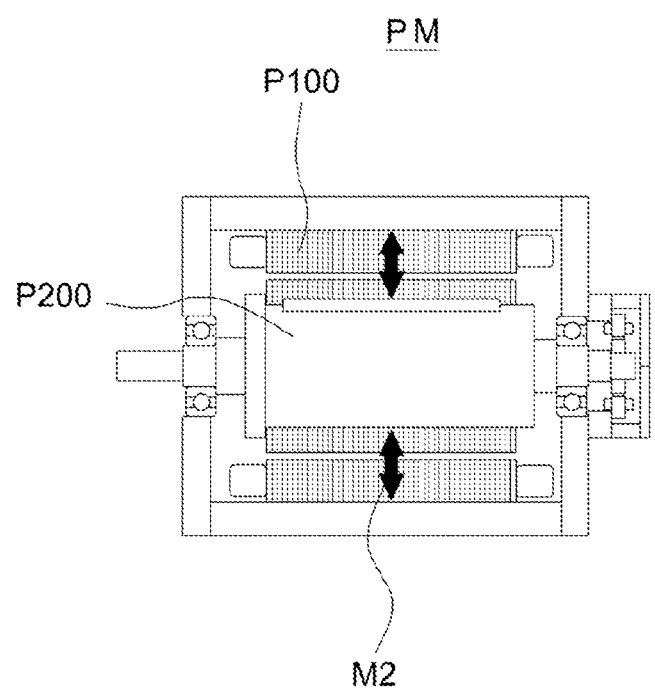

FIG. 2 is a conceptual view for comparing the axial flux permanent magnet motor with a radial flux permanent magnet motor.

Referring to FIG. 2, in a case of the axial flux permanent magnet motor (AFPM) 10, magnetic flux M1, which is generated at the stator assembly 100, is formed in a rotating axis direction of the rotor assembly 200. In contrast, in a case of a radial flux permanent magnet motor (RFPM) PM, magnetic flux M2, which is generated at a stator assembly P100, is formed in a direction perpendicular to a rotating axis of a rotor assembly P200 (that is, in a radial direction).

Therefore, in a case of the axial flux permanent magnet motor 10, the magnetic flux M1, which is generated in the rotating axis direction, interacts with the rotating plate assemblies 220 provided at front and rear sides of the stator assembly 100, such that the rotor assembly 200 is rotated. In contrast, in a case of the radial flux permanent magnet motor PM, the magnetic flux M2, which is generated in a radial direction, interacts with the rotor assembly P200 disposed in a radial inner side, such that the rotor assembly P200 is rotated.

It has been known that the aforementioned axial flux permanent magnet motor 10 produces a large amount of torque in comparison with the radial flux permanent magnet motor PM having the same volume and weight as the axial flux permanent magnet motor 10. In other words, the axial flux permanent magnet motor 10 may have better performance than that of the radial flux permanent magnet motor PM in terms of torque per unit volume or unit weight. Therefore, in a case of the axial flux permanent magnet motor 10, a size or a weight of an apparatus may be reduced with respect to the required torque in comparison with the radial flux permanent magnet motor PM, thereby enabling implementation of a compact driving means that produces a high output.

Figure 3:
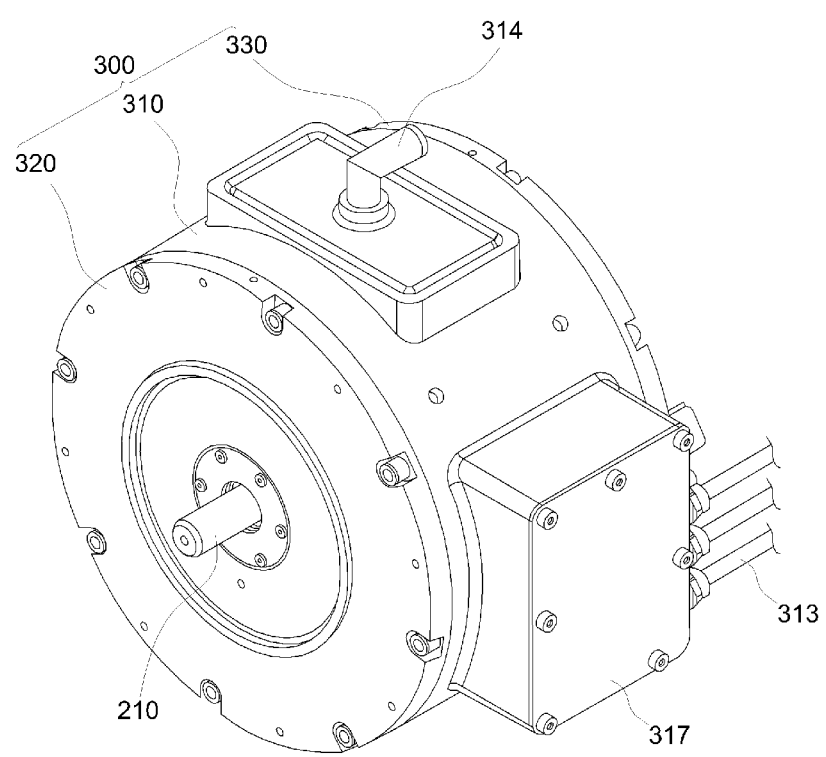
FIG. 3 is a front perspective view of the axial flux permanent magnet motor according to the exemplary embodiment of the present invention.
Figure 4:
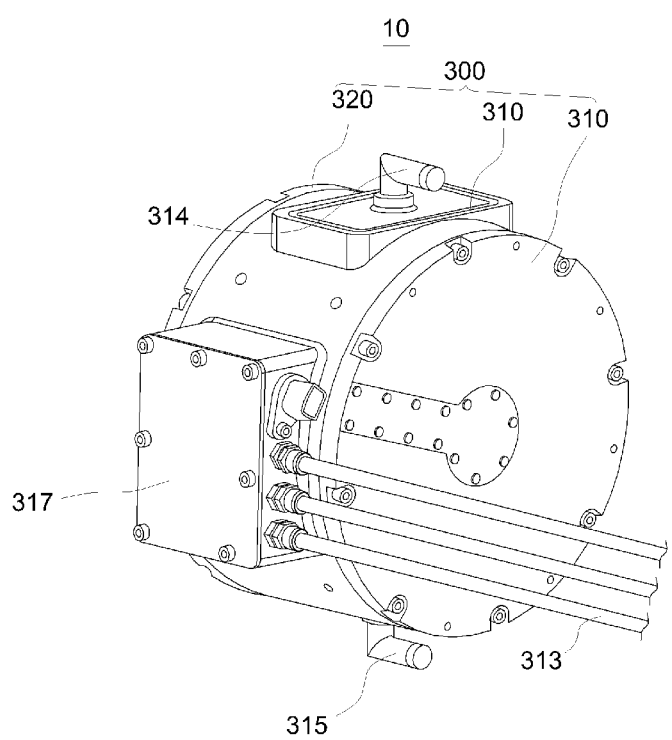
FIG. 4 is a rear perspective view of the axial flux permanent magnet motor according to the exemplary embodiment of the present invention.
Figure 5:
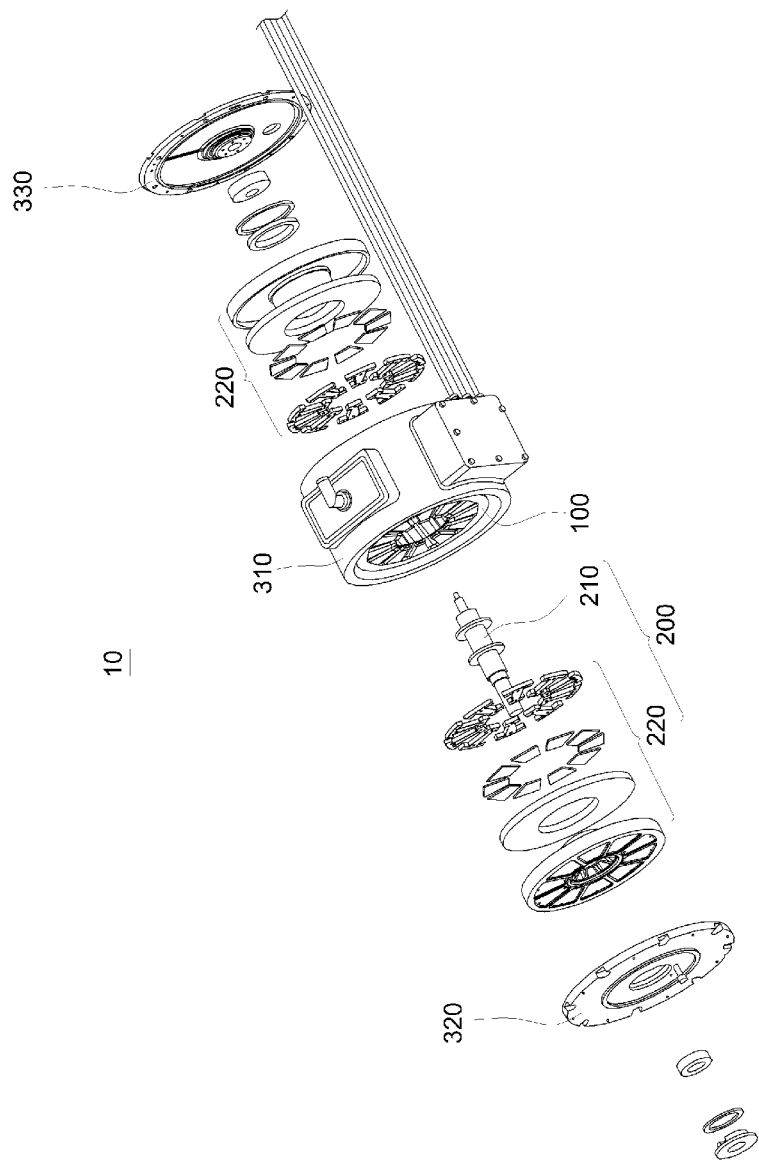
FIG. 5 is an exploded perspective view of the axial flux permanent magnet motor according to the exemplary embodiment of the present invention.

FIG. 3 is a front perspective view of the axial flux permanent magnet motor according to the exemplary embodiment of the present invention. FIG. 4 is a rear perspective view of the axial flux permanent magnet motor according to the exemplary embodiment of the present invention. FIG. 5 is an exploded perspective view of the axial flux permanent magnet motor according to the exemplary embodiment of the present invention.

Referring to FIGS. 3, 4, and 5, the axial flux permanent magnet motor 10 according to the present exemplary embodiment may include the stator assembly 100, the rotor assembly 200, and the housing assembly 300.

The housing assembly 300 may form an external appearance of the axial flux permanent magnet motor 10. The housing assembly 300 may include the motor housing 310 having a hollow and cylindrical shape of which front and rear sides are opened, and the front and rear covers 320 and 330 fastened to the front and rear surfaces of the motor housing 310. The motor housing 310, and the front and rear covers 320 and 330 form therein the mounting space for mounting the stator assembly 100 and the rotor assembly 200.

The stator assembly 100 may be mounted in the motor housing 310, and the rotor assembly 200 is disposed at a center of the stator assembly 100, and may be rotatably supported by the housing assembly 300. The rotor assembly 200 may include the shaft 210 in a front and rear direction, and the pair of rotating plate assemblies 220 that is fastened to the shaft 210. The rotating plate assembly 220 interacts with the stator assembly 100 to produce rotating drive force, and a front end of the shaft 210 is predeterminedly exposed outward from the front cover 320 of the housing assembly 300, thereby transmitting the rotating drive force to the outside.

Hereinafter, the stator assembly will be described in more detail with reference to the drawings.

Figure 6:
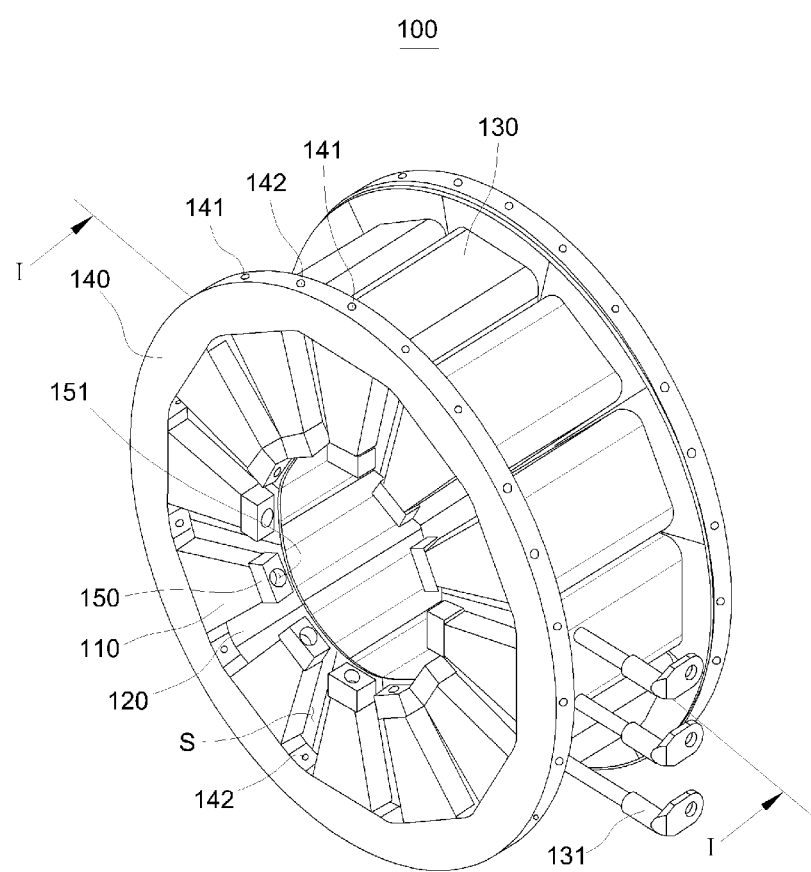
FIG. 6 is a perspective view of a stator assembly according to the exemplary embodiment of the present invention.

FIG. 6 is a perspective view of the stator assembly according to the exemplary embodiment of the present invention.

Referring to FIG. 6, the stator assembly 100 may include the stator core 110, a bobbin 120 fastened to the stator core 110, and the coil 130 wound on the bobbin 120.

The stator core 110 may have a horizontal cross section having an approximately trapezoidal shape. Here, a short opposite side of the stator core 110 may be disposed toward the radial inner side. Alternatively, the stator core 110 may be formed to have a width that becomes narrower toward the radial inner side. The reason is for disposing a plurality of stator cores 110 circumferentially or radially, as will be described below.

The stator core 110 may be formed to have a structure in which a plurality of plate members is radially laminated. A description thereof will be described below with reference to FIG. 16.

The stator core 110 may be formed to be predeterminedly extended in a front and rear direction. Here, a front end portion or a rear end portion of the stator core 110 is predeterminedly exposed outward from the bobbin 120. A supporter ring 140 and a supporter block 150, which will be described below, may be fastened to the exposed front end portion or the exposed rear end portion of the stator core 110.

A core fixing hole 111 (see FIG. 7) may be provided in the front end portion or the rear end portion of the stator core 110. The core fixing hole 111 may be penetratively and radially formed in the stator core 110. A core fixing member 144 (see FIG. 8) is inserted into and fastened to the core fixing hole 111 so as to couple the stator core 110 and the supporter ring 140 to each other. A description thereof will be described below with reference to FIG. 8.

The stator core 110 may be provided in plural numbers. The plurality of stator cores 110 may be disposed circumferentially or radially. For example, in a case of the present exemplary embodiment, a case is exemplified in which twelve stator cores 110 are circumferentially disposed. However, the number of stator cores 110 may be variously increased or decreased as necessary, and is not limited to the aforementioned exemplification.

The bobbin 120 may be fastened to the stator core 110. The bobbin 120 may be fastened to the stator core 110 so as to enclose a circumference of a side surface of the stator core 110. Alternatively, the circumference of the side surface of the stator core 110 may be accommodated inside the bobbin 120. However, in order to couple the stator core 110 and the supporter ring 140 to each other, the front end portion or the rear end portion of the stator core 110 may be predeterminedly exposed outward from the bobbin 120. Alternatively, the front end portion or the rear end portion of the stator core 110 in which the core fixing hole 111 (see FIG. 7) is provided may be predeterminedly exposed outward from the bobbin 120.

The bobbin 120 is provided for electrical insulation of the stator core 110, and may be made of an electrical insulating material.

The bobbin 120 may be provided in plural numbers. That is, the bobbin 120 may be provided in plural numbers so as to correspond to the number of the stator cores 110. The plurality of bobbins 120 may be fastened to the corresponding stator cores 110, respectively. In addition, the plurality of bobbins 120 may be disposed circumferentially or radially in a state in which the stator cores 110 are fastened to the inner sides of the bobbins 120, respectively. The plurality of bobbins 120 or the plurality of stator cores 110, which is disposed as described above, may be fixed and supported by the supporter ring 140 that will be described below.

The coil 130 may be wound on the bobbin 120. The coil 130 may be wound along a circumference of a side surface of the bobbin 120. The coil 130 generates a flow of magnetic flux in the front and rear direction or in the rotating axis direction when a current is applied (see FIG. 5).

The coil 130 may be wound on each core-bobbin unit U (see FIG. 8) made by coupling the stator core 110 and the bobbin 120 to each other. The respective wound coils 130 may be electrically connected to each other. The aforementioned manner allows winding of the coil 130 to be easily performed.

As necessary, the coil 130 may be formed in advance in a form to be wound on the bobbin 120 and the like, and then may be fitted and coupled to the bobbin 120. That is, the meaning of the aforementioned 'winding coil' includes all methods of fastening the coil 130 in various manners including not only the manner in which the coil 130 is simply wound by a winding machine or the like but also the manner in which the coil 130, which is formed in advance, is fitted and coupled.

The coil 130 may be designed so that a multi-phase current is applied thereto. The coil 130 may be provided with a coil terminal 131 in order to receive each phase current. For example, in a case of the present exemplary embodiment, a case is exemplified in which the coil 130 is provided with three coil terminals 131, and a three-phase current is applied to the coil 130. However, the number of phase currents applied to the coil 130 or the number of the coil terminals 131 may be variously increased or decreased as necessary, and is not limited to the aforementioned exemplification.

Figure 8:
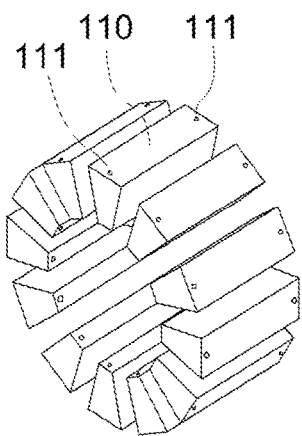
FIG. 8 is an assembly flowchart of the stator assembly according to the exemplary embodiment of the present invention.
Figure 8:
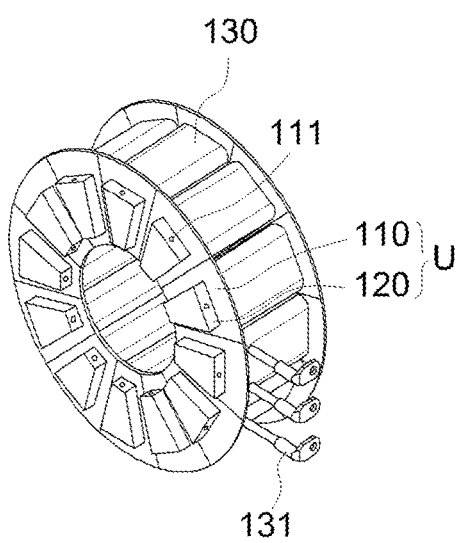
Figure 8:
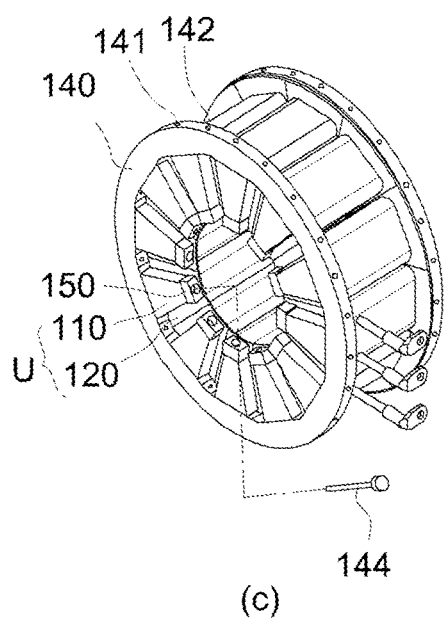
Figure 8:
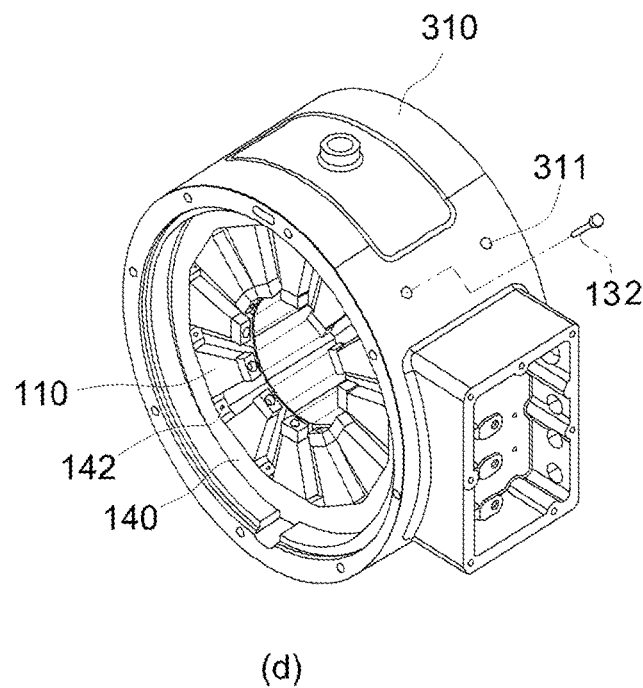

Meanwhile, the stator assembly 100 may include the supporter ring 140 and the supporter block 150 in order to fix and support the plurality of stator cores 110, and in order to be mounted to the motor housing 310 (see FIG. 8).

The supporter ring 140 and the supporter block 150 may be provided, as one set, at the front end portion and the rear end portion of the stator assembly 100, respectively. The supporter ring 140 and the supporter block 150 provided at a front end side thereof may be fastened to the front end portion of the stator core 110, and the supporter ring 140 and the supporter block 150 provided at a rear end side thereof may be fastened to the rear end portion of the stator core 110. Because the supporter rings 140 and the supporter blocks 150 provided at the front and rear end sides thereof may be formed to be similar to each other, the following description will be described on the basis of the supporter ring 140 and the supporter block 150 provided at one side.

The supporter ring 140 may be formed in a ring form or a circular loop form. The stator core 110 may be fastened to an inner circumferential side or a radial inner side of the supporter ring 140. Alternatively, the supporter ring 140 may be fastened to an outer circumferential side or a radial outer side of the stator core 110. The plurality of stator cores 110, which is circumferentially disposed, is fixed and supported by fastening the supporter ring 140 to the outer circumferential side or the radial outer side thereof.

The supporter ring 140 may be provided with a first ring fixing hole 141 in order to fasten the stator core 110. The first ring fixing hole 141 may be formed to radially penetrate the supporter ring 140.

The first ring fixing hole 141 corresponds to the core fixing hole 111 (see FIG. 7) that is provided in the stator core 110, and the core fixing member 144 (see FIG. 8) may be inserted into and fastened to the first ring fixing hole 141. The core fixing member 144 may be penetratively fastened to the supporter block 150 through the first ring fixing hole 141 and the core fixing hole 111 so as to couple the stator core 110 and the supporter ring 140 to each other (see FIG. 8).

The first ring fixing hole 141 may be provided in plural numbers. That is, the first ring fixing hole 141 may be provided in plural numbers so as to correspond to the number of the stator cores 110. The plurality of first ring fixing holes 141 may be disposed along a circumference of the supporter ring 140 at predetermined intervals.

The supporter ring 140 may be provided with a second ring fixing hole 142 in order to be fastened to the motor housing 310 (see FIG. 8). The second ring fixing hole 142 may be formed to radially penetrate the supporter ring 140.

The second ring fixing hole 142 corresponds to a housing fixing hole 311 (see FIG. 8) that is provided in the motor housing 310, and a housing fixing member 132 (see FIG. 8) may be inserted into and fastened to the second ring fixing hole 142. The housing fixing member 132 may be penetratively fastened to the motor housing 310 and the supporter ring 140 through the housing fixing hole 311 and the second ring fixing hole 142 so as to couple the motor housing 310 and the supporter ring 140 to each other (see FIG. 8).

The second ring fixing hole 142 may be disposed between the first ring fixing holes 141 so as not to interfere with the first ring fixing hole 141 or the core fixing member 144. Alternatively, the second ring fixing hole 142 may be disposed so as to correspond to a space S between the adjacent stator cores 110 that are spaced apart from each other.

The second ring fixing hole 142 may be provided in plural numbers. The plurality of second ring fixing holes 142 may be disposed along a circumference of the supporter ring 140 at predetermined intervals. In addition, as described above, the plurality of second ring fixing holes 142 may be disposed between the first ring fixing holes 141 or between the stator cores 110, respectively.

Meanwhile, an electrical insulating unit 143 (see FIG. 7) may be provided at a contact surface between the supporter ring 140 and the stator core 110.

Figure 7:
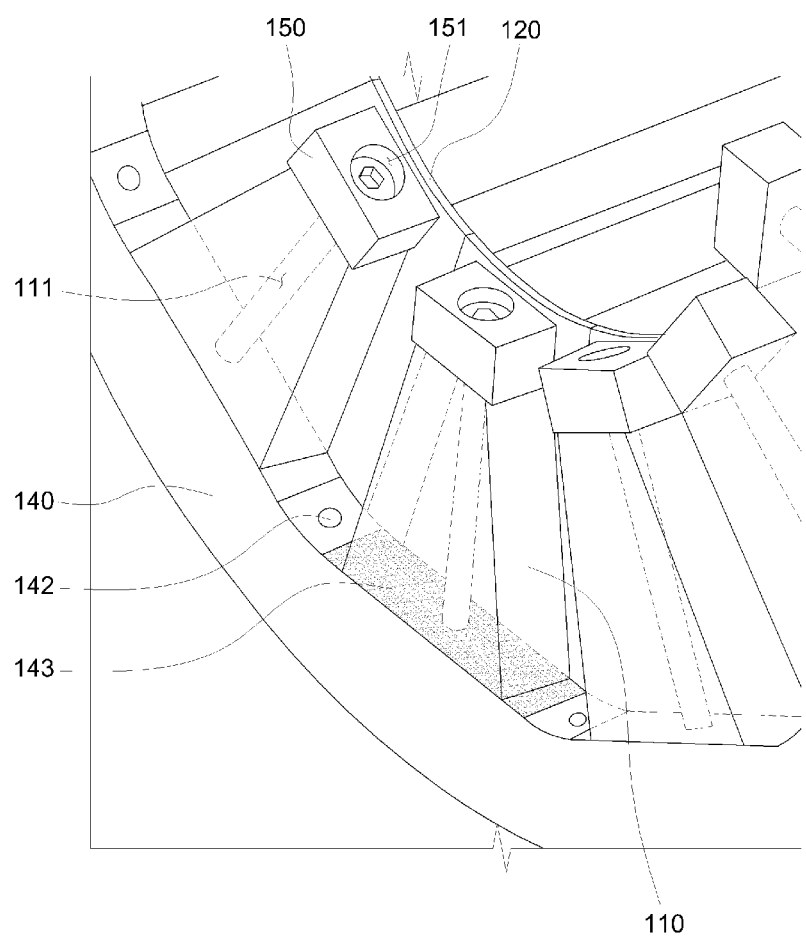
FIG. 7 is a schematic view illustrating a supporter ring and an electrical insulating unit according to the exemplary embodiment of the present invention.

FIG. 7 is a schematic view illustrating the supporter ring and the electrical insulating unit according to the exemplary embodiment of the present invention.

Referring to FIG. 7, the front end portion or the rear end portion of the stator core 110 is predeterminedly exposed outward from the bobbin 120. In addition, the supporter block 150 is fastened to an inner circumferential side of the exposed stator core 110, and the supporter ring 140 is fastened to an outer circumferential side thereof.

Here, as will be described below, because the supporter blocks 150 according to the present exemplary embodiment are formed to be separated into plural numbers, electrical insulation may be secured between the adjacent stator cores 110.

Meanwhile, the supporter ring 140 comes into contact with the outer circumferential side of the stator core 110 of which inner circumferential surface is exposed. The supporter ring 140 may be integrally formed in order to fix and support the plurality of stator cores 110, and thereby an eddy current loss may occur due to contact between the supporter ring 140 and the stator core 110.

Therefore, the supporter ring 140 may be formed of an electrical insulating material in order to reduce an eddy current loss.

In addition, the electrical insulating unit 143 may be provided at a contact portion between the supporter ring 140 and the stator core 110. In other words, the electrical insulating unit 143 may be provided at the inner circumferential surface of the supporter ring 140 with which the stator core 110 comes into contact. Alternatively, the electrical insulating unit 143 may be interposed between the stator core 110 and the inner circumferential surface of the supporter ring 140. This electrical insulating unit 143 may reduce an eddy current loss by improving electrical insulation between the stator core 110 and the supporter ring 140.

The electrical insulating unit 143 may include an electrical insulating tape, an electrical insulating sheet, an electrical insulating paper, an electrical insulating film, or the like. In order to secure sufficient electrical insulation, the electrical insulating tape or the like, which is wider than a contact area between the stator core 110 and the supporter ring 140, may be attached or interposed. In addition, the electrical insulating tape or the like may be attached or interposed at each contact portion where the plurality of stator cores 110 and the supporter ring 140 come into contact with each other (however, for convenience, FIG. 7 illustrates only one electrical insulating unit 143).

In addition, the electrical insulating unit 143 may include electrical insulating paint, electrical insulating resin, or the like. The electrical insulating paint or the like may be applied on the inner circumferential surface of the supporter ring 140, the exposed stator core 110, or the like.

Referring back to FIG. 6, the supporter block 150 may be fastened to the inner circumferential side or the radial inner side of the stator core 110. That is, the aforementioned supporter ring 140 may be fastened to the radial outer side of the stator core 110, and the supporter block 150 may be fastened to the radial inner side of the stator core 110.

The supporter block 150 may be provided with a block fixing hole 151. The block fixing hole 151 may be penetratively and radially formed in the supporter block 150. The block fixing hole 151 corresponds to the first ring fixing hole 141 and the core fixing hole 111, and the core fixing member 144 (see FIG. 8) may be inserted into and fastened to the block fixing hole 151.

The supporter block 150 broadens a pressing surface on which the core fixing member 144 presses the stator core 110 when the core fixing member 144 is fastened such that the stator core 110 may be more firmly fixed and supported. In other words, the supporter block 150 may perform a function similar to that of a type of washer, and comes into contact with an inner circumferential side surface of the stator core 110 when the core fixing member 144 such as a bolt or the like is fastened, thereby more firmly fixing and supporting the stator core 110.

Unlike the aforementioned supporter ring 140, the supporter blocks 150 may be formed to be separated into plural numbers. The plurality of supporter blocks 150 may be fastened to the inner circumferential side or the radial inner side of the stator core 110, respectively. In addition, the plurality of supporter blocks 150 may be disposed to be circumferentially spaced apart from each other at predetermined intervals. The reason is for securing electrical insulation between the stator cores 110 that are circumferentially adjacent to each other.

As described above, the stator assembly 100 according to the present exemplary embodiment may improve electrical insulation of the stator core 110 by the supporter blocks 150, which are formed to be separated into plural numbers, and the electrical insulating unit 143 (see FIG. 7) which is provided on the supporter ring 140. Therefore, an eddy current loss may be minimized, and a motor output may be improved.

FIG. 8 is an assembly flowchart of the stator assembly according to the exemplary embodiment of the present invention.

First, referring to FIG. 8(a), a plurality of stator cores 110 may be provided. In a case of the present exemplary embodiment, a case is exemplified in which twelve stator cores 110 are provided.

Next, referring to FIG. 8(b), the bobbin 120 is fastened to the stator core 110. Here, the bobbin 120 may be fastened to each of the plurality of stator cores 110. For explanatory convenience, a unit made by coupling the stator core 110 and the bobbin 120 to each other will be referred to as a 'core-bobbin unit U'. That is, the bobbin 120 is fastened to each of the plurality of stator cores 110 such that the plurality of core-bobbin units U may be provided.

Meanwhile, the stator core 110 may be fastened to the bobbin 120 so that the front end portion and the rear end portion thereof are predeterminedly exposed outward from the bobbin 120. Alternatively, the stator core 110 may be fastened to the bobbin 120 so that the core fixing hole 111 is exposed outward from the bobbin 120. The reason is for fastening the stator core 110 and the supporter ring 140.

The coil 130 may be wound after the stator core 110 and the bobbin 120 are fastened. In order to easily wind the coil 130, the coil 130 may be wound as a unit of each of the core-bobbin units U.

In addition, as illustrated in the drawing, the plurality of core-bobbin units U on which the coils 130 are wound is circumferentially and consecutively disposed so as to form a form such as a circular loop, as a whole.

A description regarding coupling relationships between the stator core 110, the bobbin 120, and the coil 130 will be amplified with reference to FIG. 11 and the like that will be described below.

Next, referring to FIG. 8(c), the supporter ring 140 and the supporter block 150 are fastened to fix and support the plurality of core-bobbin units U.

More specifically, the supporter rings 140 are fastened to the front and rear end sides of the plurality of core-bobbin units U, respectively. Here, the supporter rings 140 are disposed to correspond to the front and rear end portions of the stator core 110, which are exposed outward from the bobbin 120, and may be fastened so as to enclose the outer circumferential sides of the plurality of stator cores 110.

The supporter block 150 may be fastened to the inner circumferential side of the stator core 110. As described above, the supporter blocks 150 are formed to be separated into plural numbers, and fastened to the inner circumferential sides of the stator cores 110.

In addition, the core fixing members 144 are radially fastened to the supporter rings 140, the stator cores 110, and the supporter blocks 150. The core fixing member 144 may be inserted into and fastened to the block fixing hole 151, the core fixing hole 111, and the first ring fixing hole 141 (see FIG. 7). The core fixing members 144 fix and support the stator cores 110 or the core-bobbin units U in a front and rear direction and in a radial direction.

As the core fixing member 144, a fastening means such as a bolt, a pin, or the like may be used. In addition, the core fixing member 144 may be provided in plural numbers so as to correspond to the number of the stator cores 110 or the number of the core-bobbin units U.

Meanwhile, the core fixing member 144 may be inserted and fastened from the radial inner side toward the radial outer side. In other words, the core fixing member 144 may be inserted and fastened from the supporter block 150 toward the supporter ring 140. The reason is for, when a bolt or the like is used as the core fixing member 144, allowing a bolt head to press the supporter block 150 so as to support the stator core 110. Here, the stator core 110 is pressed and supported by a contact surface with the supporter block 150 and thus may be more firmly supported.

Next, referring to FIG. 8(d), the motor housing 310 is assembled. The motor housing 310 may be fastened to the supporter ring 140 by the housing fixing member 132.

More specifically, the housing fixing hole 311 may be provided in the motor housing 310 in order to fasten the housing fixing member 132. The housing fixing hole 311 corresponds to the second ring fixing hole 142 that is provided in the supporter ring 140. The housing fixing hole 311 may be penetratively formed in an outer surface of the motor housing 310.

The housing fixing hole 311 may be formed in plural numbers. The plurality of housing fixing holes 311 may be circumferentially disposed in the outer surface of the motor housing 310. The reason is for fixing and supporting the stator core 110 and the like in a rotation direction thereof. In addition, the plurality of housing fixing holes 311 may be disposed at front and rear sides of the outer surface of the motor housing 310. The reason is for fixing and supporting the stator core 110 and the like in a front and rear direction or in a rotating axis direction thereof.

The housing fixing members 132 are radially fastened to the motor housing 310 and the supporter rings 140. The housing fixing member 132 may be inserted into and fastened to the housing fixing hole 311 and the second ring fixing hole 142.

As the housing fixing member 132, a fastening means such as a bolt, a pin, or the like may be used.

The housing fixing member 132 may be provided in plural numbers in accordance with the number of the housing fixing holes 311 or the number of the second ring fixing holes 142. The plurality of housing fixing members 132 fastens the supporter rings 140, which are disposed at the front and rear end sides of the stator core 110, to the motor housing 310, respectively, thereby fixing and supporting the stator core 110 and the like in the front and rear direction or in the rotating axis direction thereof. In addition, the plurality of housing fixing members 132 circumferentially fastens the supporter ring 140 and the motor housing 310 to each other, thereby fixing and supporting the stator core 110 and the like in the rotation direction thereof.

Meanwhile, as necessary, the stator assembly may be manufactured by an insert injection molding method.

Figure 9:
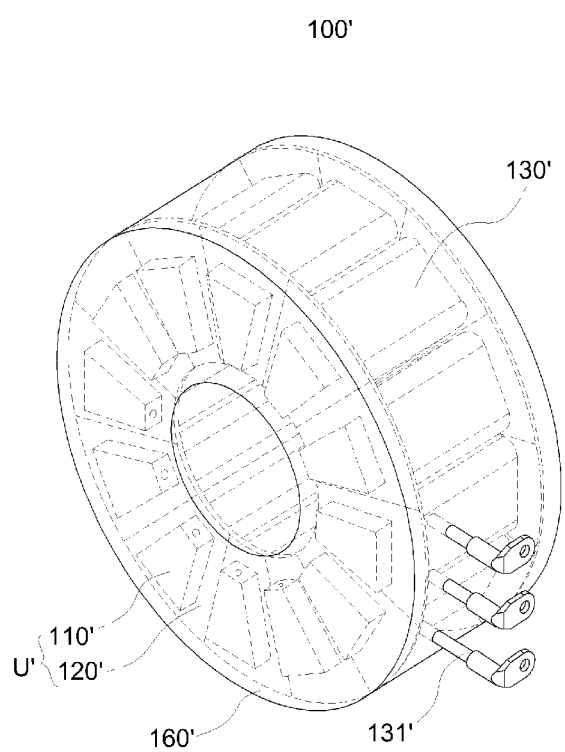
FIG. 9 is a perspective view illustrating a stator assembly according to another exemplary embodiment of the present invention.

FIG. 9 is a perspective view illustrating a stator assembly according to another exemplary embodiment of the present invention.

It is noted that for explanatory convenience, FIG. 9 illustrates an interior by seeing through a part thereof.

Referring to FIG. 9, a stator assembly 100' according to the present exemplary embodiment may include a stator core 110', a bobbin 120', and a coil 130'. The stator core 110', the bobbin 120', and the coil 130' may be formed to be identical with or similar to those of the aforementioned exemplary embodiment.

However, unlike the aforementioned exemplary embodiment, the stator assembly 100' according to the present exemplary embodiment may include a resin part 160'. The resin part 160' fixes and supports the stator core 110' and the like. In other words, the plurality of stator cores 110' and the like may be impregnated inside the resin part 160' so as to be fixed and supported.

The resin part 160' may be substituted for the supporter ring 140 or the supporter block 150 of the aforementioned exemplary embodiment. That is, unlike the aforementioned exemplary embodiment, in the stator assembly 100' according to the present exemplary embodiment, the supporter ring 140 or the supporter block 150 is not required. In addition, in the stator assembly 100' according to the present exemplary embodiment, the core fixing member 144 for fastening the supporter ring 140 and the stator core 110 is also not required (see FIG. 8). Therefore, the number of components of the stator assembly 100' may be reduced, and an assembly process may be simplified.

In addition, in the stator assembly 100' according to the present exemplary embodiment, the core fixing hole 111 for fastening the core fixing member 144 is not required. That is, in a case of the present exemplary embodiment, the core fixing hole 111 may not be provided in the stator core 110' (see FIG. 8). Therefore, in a case of the present exemplary embodiment, a cross section area of a magnetic flux path of the stator core 110' may be increased. In other words, because of omission of the hole from the stator core 110', a cross section area of a path through which magnetic flux flows in the stator core 110' may be increased. This increase in a cross section area of a path of magnetic flux improves an output of the motor.

Meanwhile, the resin part 160' may include electrical insulating resin. The electrical insulating resin may improve electrical insulation between the stator cores 110', and may reduce an eddy current loss.

In addition, the resin part 160' may be manufactured by an insert injection molding method. A description thereof will be described below with reference to FIG. 10.

Figure 10:
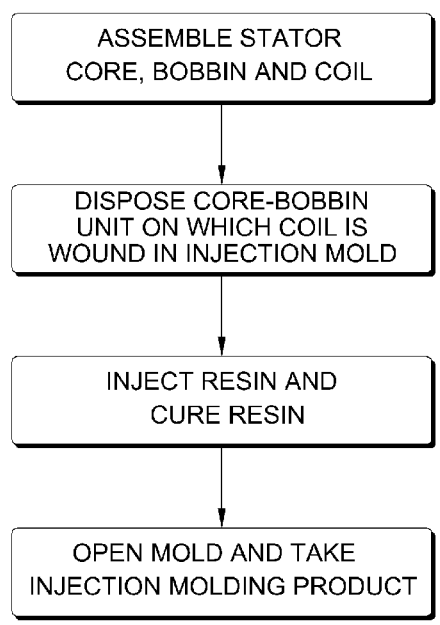
FIG. 10 is a flowchart illustrating a method of manufacturing the stator assembly illustrated in FIG. 9.

FIG. 10 is a flowchart illustrating a method of manufacturing the stator assembly illustrated in FIG. 9.

Referring to FIG. 10, first, the stator core 110' and the bobbin 120' are assembled. In addition, the coil 130' is wound on an assembled core-bobbin unit U'. This process is similar to the aforementioned steps illustrated in FIGS. 8(a) and 8(b).

Next, the plurality of core-bobbin units U' on which the coils 130' are wound is disposed in a mold. That is, the plurality of core-bobbin units U' is disposed in the mold in a form as illustrated in FIG. 8(b).

When the mold disposition is completed, the mold is closed, molten resin is injected, and then the injected resin is cured or solidified.

Lastly, when the mold is opened and the injection molding product is taken out, the stator assembly 100' is manufactured which has a form in which the stator core 110' and the like are impregnated and fixed inside the resin part 160', as illustrated in FIG. 9.

As necessary, for connection of a coil terminal 131', the injection molding method may be performed by exposing the coil terminal 131' outward from the resin part 160' (see FIG. 9).

The aforementioned insert injection molding method may greatly improve assembly workability of the stator assembly 100'. That is, the manufacture of the stator assembly 100' may be completed by directly performing the injection molding method in such a state of FIG. 8(b) without a process of assembling the supporter ring 140 or the supporter block 150 of the aforementioned exemplary embodiment. Therefore, productivity may be remarkably improved.

Hereinafter, a coupling structure between the stator core and the bobbin will be described in more detail.

Figure 11:
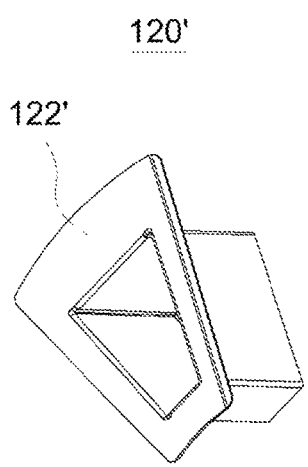
FIG. 11 is a perspective view illustrating a bobbin according to the exemplary embodiment of the present invention.
Figure 11:
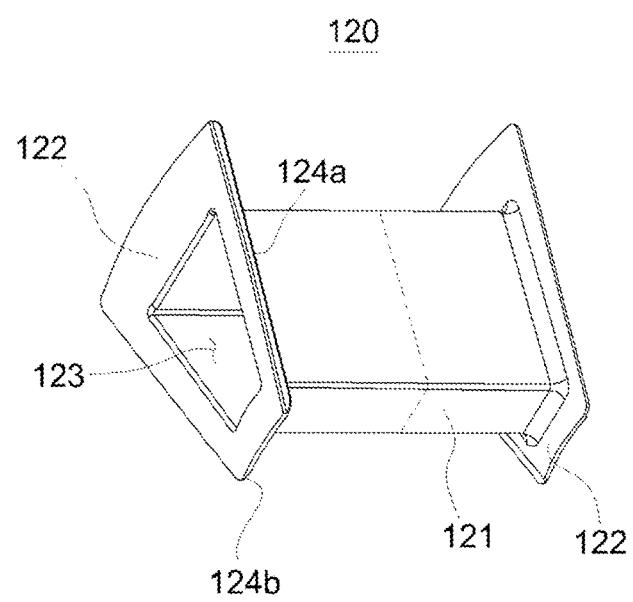

FIG. 11 is a perspective view illustrating the bobbin according to the exemplary embodiment of the present invention.

Referring to FIG. 11 and the aforementioned FIG. 8, the bobbin 120 may include a bobbin body 121, and flange portions 122 provided at both end portions of the bobbin body 121.

The bobbin body 121 may be fastened to the stator core 110 so as to enclose the circumference of the side surface of the stator core 110. A core inserting hole 123 for inserting the stator core 110 may be provided inside the bobbin body 121.

The core inserting hole 123 may be penetratively formed along a longitudinal direction of the bobbin body 121. In addition, the core inserting hole 123 may have a horizontal cross section having an approximately trapezoidal form so as to correspond to a shape of the stator core 110. The stator core 110 is inserted into the core inserting hole 123 such that the circumference of the side surface thereof is enclosed by the bobbin body 121.

The flange portions 122 may be provided at both end portions of the bobbin body 121, respectively. The flange portion 122 may be formed in an approximately trapezoidal form or an approximately sector form so as to correspond to a shape of the core inserting hole 123.

In addition, one side edge of the flange portion 122 may be connected to or come into contact with the flange portion of another adjacent bobbin.

Figure 12:
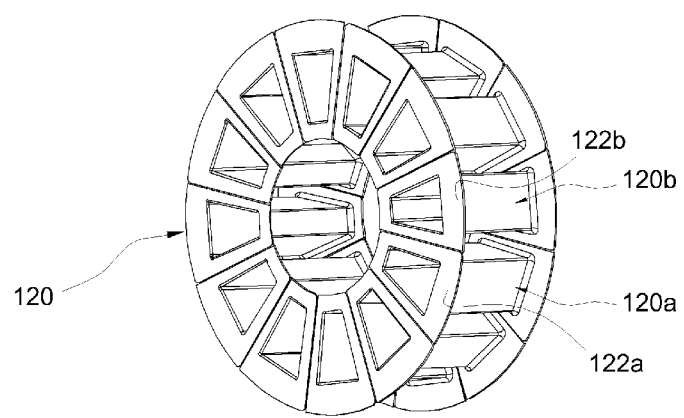
FIG. 12 is a perspective view illustrating an aspect in which a plurality of bobbins according to the exemplary embodiment of the present invention is disposed in a circular loop form.

FIG. 12 is a perspective view illustrating an aspect in which a plurality of bobbins according to the exemplary embodiment of the present invention is disposed in a circular loop form.

Referring to FIG. 12, a plurality of bobbins 120 may be circumferentially and consecutively disposed. In addition, as illustrated in the drawing, the plurality of bobbins 120 has a ring form or a circular loop form, as a whole. The description has been described with reference to the aforementioned FIG. 8(b). However, it is noted that for explanatory convenience, the stator core 110 (see FIG. 8), which is fastened to the bobbin 120, is omitted in FIG. 12.

In a case as described above, the flange portions 122 of the adjacent bobbins 120 come into contact with each other or are connected to each other. That is, when for explanatory convenience, a bobbin 120a on one side is referred to as a 'first bobbin 120a', and another adjacent bobbin 120b is referred to as a 'second bobbin 120b', one side edge of a first flange portion 122a of the first bobbin 120a comes into contact with or is connected to one side edge of a second flange portion 122b of the second bobbin 120b.

Here, a clearance between the first and second flange portions 122a and 122b, which come into contact with each other or are connected to each other, may degrade electrical insulation of the stator core 110. That is, when a clearance or a gap is formed between the first and second flange portions 122a and 122b, leakage magnetic flux occurs between the stator core 110 and the supporter ring 140, which is fastened to the outer circumferential side of the stator core 110, thereby causing electrical insulation to deteriorate (see FIG. 8).

In order to resolve the aforementioned problem, in the bobbin 120 according to the present exemplary embodiment, stepped portions 124a and 124b may be provided at both edge portions of the flange portion 122.

That is, referring back to FIG. 11, the stepped portions 124a and 124b may be formed at one side edge and an opposite edge of the flange portion 122, respectively. The stepped portions 124a and 124b may be formed along the edge of the flange portion 122.

In addition, both the stepped portions 124a and 124b may be formed at different surfaces or in different directions. That is, when for explanatory convenience, a stepped portion 124a formed at one side edge of the flange portion 122 is referred to as a 'first stepped portion 124a', and a stepped portion 124b formed at the opposite edge thereof is referred to as a 'second stepped portion 124b', the first stepped portion 124a may be formed at a front surface portion of the flange portion 122, and the second stepped portion 124b may be formed at a rear surface portion of the flange portion 122.

The first and second stepped portions 124a and 124b minimize a clearance or a gap between the adjacent flange portions 122 when the plurality of bobbins 120 is coupled. In other words, the second stepped portion 124b of another adjacent flange portion 122 is seated on or overlapped with the first stepped portion 124a, which is provided at one side edge of the flange portion 122, such that a clearance and a gap between the flange portions 122 is minimized.

In addition, the minimization of a clearance or a gap improves electrical insulation between the stator core 110 and the supporter ring 140. Moreover, when electrical insulating performance of the stator core 110 is improved, an output of the motor may also be increased.

Meanwhile, the bobbin 120 may be formed to be separated into a plurality of bobbin segments 120'. For example, the bobbin 120 may be formed to be separated into a pair of bobbin segments 120' by separating an intermediate portion of the bobbin body 121. Each of the bobbin segments 120' is provided with a flange portion 122' at one end thereof, and the other end thereof is bonded with another bobbin segment 120', thereby forming a single bobbin 120. However, as necessary, of course, the bobbin 120 may be integrally formed, or may be formed to be separated into three or more pieces.

Figure 13:
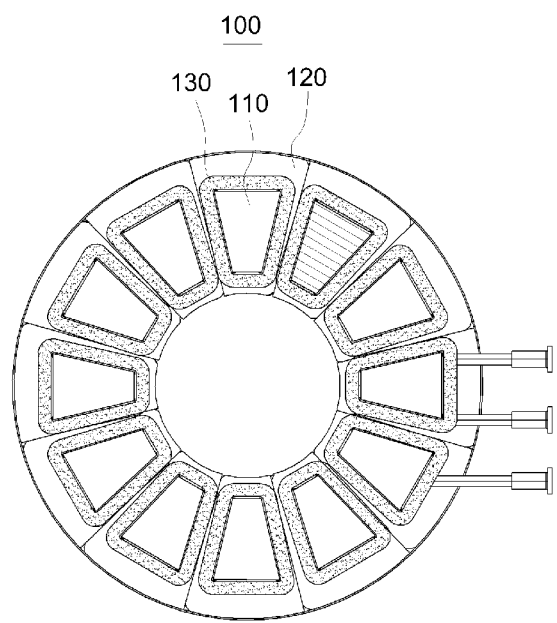
FIG. 13 is a horizontal cross-sectional view of the stator assembly according to the exemplary embodiment of the present invention.

FIG. 13 is a horizontal cross-sectional view of the stator assembly according to the exemplary embodiment of the present invention.

It is noted that FIG. 13 is a cross-sectional view taken along line I-I depicted in FIG. 6.

Referring to FIG. 13, the stator core 110 may be accommodated inside the bobbin 120 in a state in which the circumference of the side surface thereof is enclosed by the bobbin 120, and the coil 130 is wound again on a circumference of a side surface of the bobbin 120.

Here, as described above with reference to FIG. 11, the core inserting hole 123 may be penetratively formed in the bobbin body 121 in order to fasten the stator core 110 in the bobbin 120, and the stator core 110 is inserted into and fastened to the core inserting hole 123. In addition, the core inserting hole 123 is formed in a shape corresponding to a horizontal cross-sectional shape of the stator core 110 so that the stator core 110 may be inserted. For example, the stator core 110 and the core inserting hole 123 may have a horizontal cross-sectional shape corresponding to an approximately trapezoidal shape.

Figure 14:
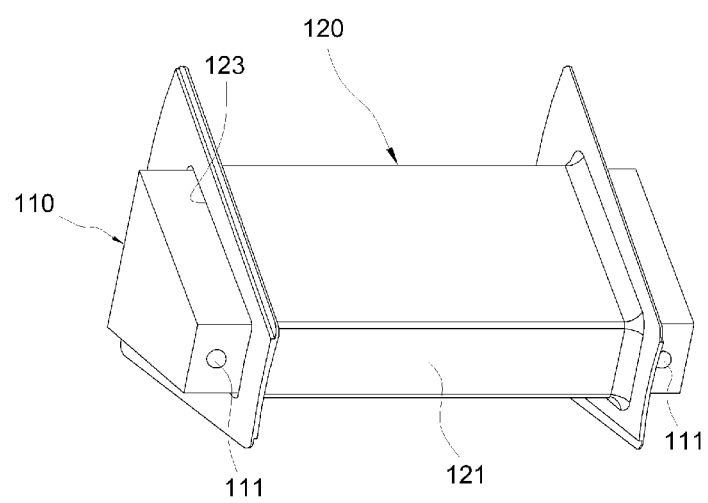
FIG. 14 is a schematic view illustrating a state in which a stator core is inserted into and fastened to the bobbin according to the exemplary embodiment of the present invention.

FIG. 14 is a schematic view illustrating a state in which the stator core is inserted and fastened to the bobbin according to the exemplary embodiment of the present invention.

Referring to FIG. 14, the stator core 110 is inserted into one side of the core inserting hole 123, and fastened to the bobbin 120.

Here, when the stator core 110 is inserted as described above, interference may occur due to an edge portion of the stator core 110. That is, an edge of the stator core 110 is caught by the core inserting hole 123 or the bobbin body 121, and thereby assembly may be hindered, or the process of inserting and fastening the stator core 110 may be difficult.

Figure 16:
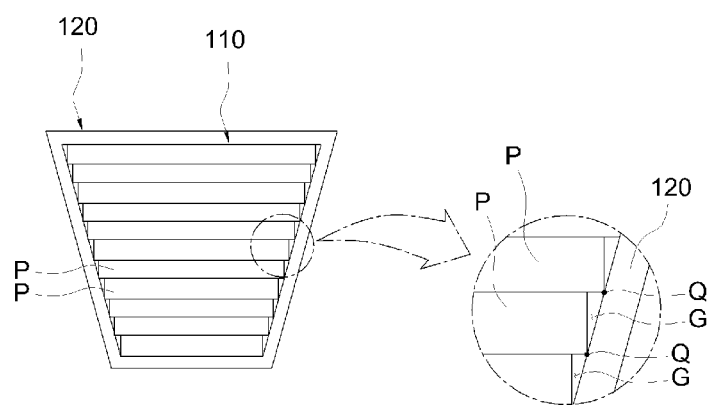
FIG. 16 is a conceptual view illustrating a lamination structure of the stator core illustrated in FIG. 13.

More specifically, the stator core 110 may be formed in a structure in which a plurality of plate shaped members is radially laminated, and therefore the edge of the stator core 110 may be formed in a very sharp shape or a pointed shape (see FIG. 16). Therefore, when the stator core 110 is inserted and fastened, interference may occur due to the sharp shaped or pointed shaped edge, and the interference may be a factor that degrades ease of assembly of the stator core 110.

For example, in a case in which a rounding is predeterminedly formed at an edge of the core inserting hole 12 in a manufacturing process, the sharp shaped or pointed shaped edge of the stator core 110 interferes with the rounded edge of the core inserting hole 123, thereby hindering the process of inserting and fastening the stator core 110.

In order to resolve the aforementioned problem, a clearance groove 125 (see FIG. 15) may be formed at an edge portion of the core inserting hole 123.

Figure 15:
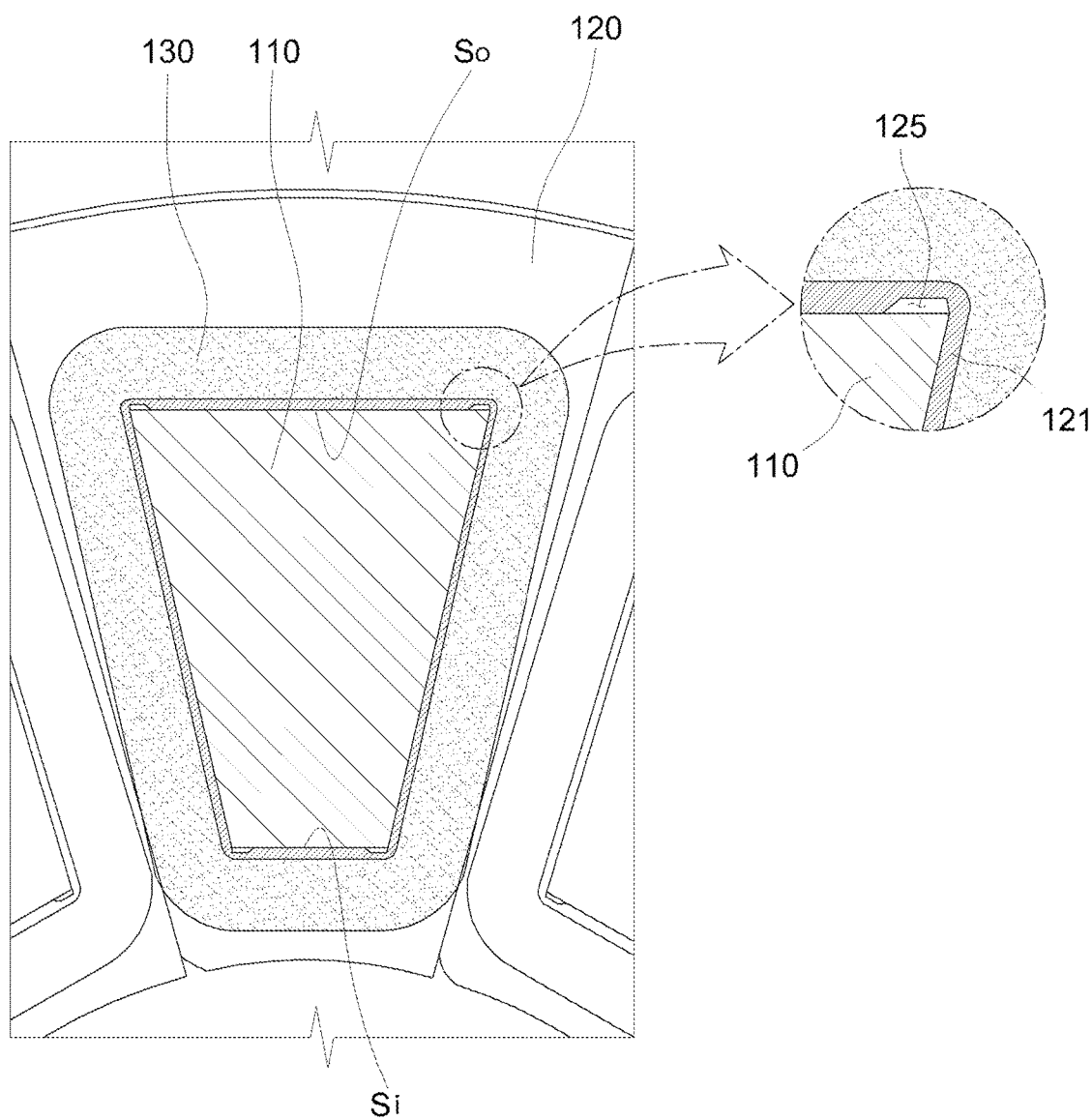
FIG. 15 is an enlarged view of the horizontal cross-sectional view illustrated in FIG. 14.

FIG. 15 is an enlarged view of the horizontal cross-sectional view illustrated in FIG. 14.

Referring to FIG. 15, the clearance groove 125 may be provided at each edge portion of the core inserting hole 123 to which the stator core 110 is inserted and fastened. Alternatively, the clearance groove 125 may be provided at each edge portion of an inner side surface of the bobbin body 121.

The clearance groove 125 may be formed by predeterminedly and concavely depressing the inner side surface of the bobbin body 121. When, in the inner side surface of the bobbin body 121, a surface, which is disposed at a radial inner side, is referred to as an inner circumferential side inner side surface Si, and a surface, which is disposed at a radial outer side, is referred to as an outer circumferential side inner side surface So, the clearance groove 125 may be formed by predeterminedly and concavely depressing both side end portions of the inner circumferential side inner side surface Si, or by predeterminedly and concavely depressing both side end portions of the outer circumferential side inner side surface So.

In addition, although not illustrated, the clearance groove 125 may be formed at the inner side surface of the bobbin body 121 so as to be extended along a longitudinal direction or a front and rear direction (see FIG. 14).

The clearance groove 125 may prevent the edge portion of the stator core 110 from interfering with the core inserting hole 123 or the edge portion of the bobbin body 121. In other words, the clearance groove 125 forms a predetermined clearance or a tolerance at the core inserting hole 123 or the edge portion of the bobbin body 121 such that the sharp shaped or pointed shaped edge of the stator core 110 may be smoothly inserted into and fastened to the core inserting hole 123. The clearance groove 125 may facilitate work of assembling the stator core 110, and may reduce damage to the bobbin body 121 or the like due to the edge of the stator core 110.

Meanwhile, referring to the aforementioned FIG. 13, the stator core 110 may be formed in a structure in which a plurality of plate shaped members is radially laminated (for convenience, FIG. 13 illustrates the lamination structure of only one stator core 110).

FIG. 16 is a conceptual view illustrating the lamination structure of the stator core illustrated in FIG. 13.

Referring to FIG. 16, the stator core 110 may be formed in a structure in which a plurality of thin plate shaped core steel plates P is radially laminated. Here, because the stator core 110 has a horizontal cross section having an approximately trapezoidal shape, the plurality of core steel plates P needs to have different widths, respectively. In other words, in order for the stator core 110 to have a horizontal cross section having an approximately trapezoidal shape, the core steel plates P need to be laminated so that widths of the core steel plates P increases toward the radial outer side thereof.

In a case as described above, the mold is required as many as the number of laminations of the core steel plate P when the stator core 110 is manufactured. In other words, because widths of the plurality of core steel plates P are different from each other, the respective molds are required in order to manufacture each of the core steel plates P. The aforementioned problem increases the number of molds, thereby disadvantageously affecting production costs and mass productivity.

In addition, in a case as described above, the inner side surface of the bobbin 120 and the laminated core steel plates P come into contact with each other at a number of contact points Q. In other words, because both end portions of each of the core steel plates P come into point contact with the inner side surface of the bobbin 120, the plurality of contact points Q may be formed between the bobbin 120 and the stator core 110. Alternatively, a plurality of air gaps G may be formed between the bobbin 120 and the stator core 110. The plurality of contact points Q or the plurality of air gaps G may cause damage to the stator core 110 or the bobbin 120 when the coil 130 is wound on the outer side surface of the bobbin 120.

Figure 17:
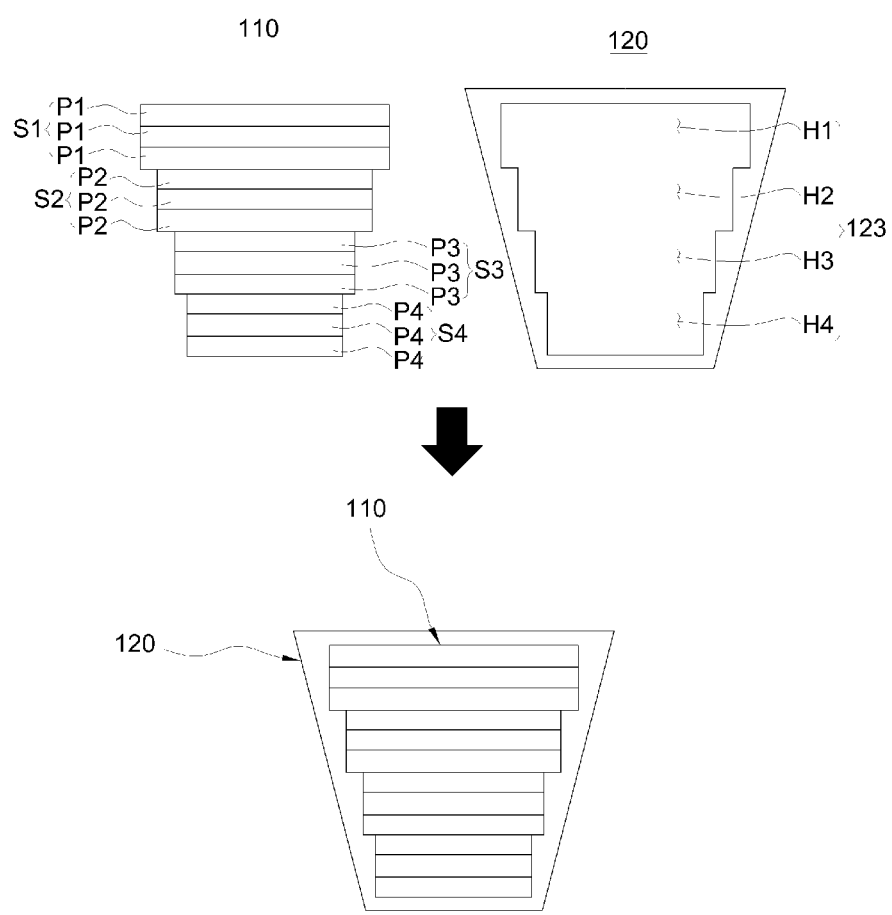
FIG. 17 is a conceptual view illustrating the lamination structure of the stator core according to the exemplary embodiment of the present invention.

FIG. 17 is a conceptual view illustrating the lamination structure of the stator core according to the exemplary embodiment of the present invention.

Referring to FIG. 17, the stator core 110 according to the present exemplary embodiment may be formed by laminating a plurality of core steel plate sets S1, S2, S3, and S4. Here, each of the core steel plate sets S1, S2, S3, and S4 may be formed by laminating core steel plates P1, P2, P3, and P4 having the same width. The reason is for avoiding a plurality of molds required to manufacture the core steel plate P due to the different widths of the respective core steel plates P as illustrated in the aforementioned FIG. 16.

For example, the stator core 110 according to the present exemplary embodiment may include first to fourth core steel plate sets S1, S2, S3, and S4. The first to fourth core steel plate sets S1, S2, S3, and S4 may be formed by laminating a plurality of first to fourth core steel plates P1, P2, P3, and P4, respectively. Here, the first to fourth core steel plates P1, P2, P3, and P4 may have first to fourth widths, respectively.

That is, in the stator core 110 according to the present exemplary embodiment, the plurality of first core steel plates P1 having the first width is laminated so as to form the first core steel plate set S1, and the plurality of second core steel plates P2 having the second width is laminated so as to form the second core steel plate set S2. In addition, similarly to the foregoing, the third and fourth core steel plates P3 and P4 are laminated, respectively, so as to form the third and fourth core steel plate sets S3 and S4. The first to fourth core steel plate sets S1, S2, S3, and S4 may be sequentially laminated so as to form a type of multi-stepped structure.

In a case as described above, each of the core steel plate sets S1, S2, S3, and S4 is formed by laminating the core steel plates P1, P2, P3, and P4 having the same width, thereby reducing the number of molds for manufacturing the core steel plates P1, P2, P3, and P4. That is, in a case as illustrated in FIG. 13, merely four molds are required to manufacturing the first to fourth core steel plates P1, P2, P3, and P4. Therefore, in comparison with the case that is described above with reference to FIG. 16, the number of molds may be remarkably reduced, and hereby, production costs may be reduced, and productivity may be improved.

Meanwhile, in the foregoing, a case is exemplified in which the stator core 110 is formed of the first to fourth core steel plate sets S1, S2, S3, and S4, but as necessary, of course, the number of core steel plate sets may be variously increased or decreased.

The stator core 110, which is formed of the plurality of core steel plate sets S1, S2, S3, and S4 or formed in a multi-stepped structure as described above, may cause a problem when being fastened to the bobbin 120. That is, air gaps G (see FIG. 16) between the stator core 110 and the inner side surface of the bobbin 120 may be amply formed due to the structure of the stator core 110, and hereby, damage may occur when the coil is wound.

In order to resolve the aforementioned problem, the bobbin 120 may be formed in a multi-stepped structure corresponding to that of the stator core 110. In other words, the inner side surface of the bobbin 120 may be formed in a multi-stepped structure so as to correspond to widths of the respective core steel plate sets S1, S2, S3, and S4.

For example, the core inserting hole 123 inside the bobbin 120 to which the stator core 110 is inserted and fastened may be formed by radially and sequentially disposing first to fourth core inserting holes H1, H2, H3, and H4 that are formed to correspond to widths of respective core steel plate sets S1, S2, S3, and S4. Here, the first core inserting hole H1 corresponds to the first core steel plate set S1, and may be formed to have a width corresponding to the first width. Similarly to the foregoing, the second to fourth core inserting holes H2, H3, and H4 may also be formed to correspond to the second to fourth core steel plate sets S2, S3, and S4.

In a case as described above, the first to fourth core steel plate sets S1, S2, S3, and S4 may be inserted into and fastened to the first to fourth core inserting holes H1, H2, H3, and H4, respectively, and therefore the stator core 110 may come into completely close contact with the inner side surface of the bobbin 120. That is, unlike the aforementioned FIG. 16, the air gap G is not formed between the stator core 110 and the inner side surface of the bobbin 120. Therefore, damage to the stator core 110 or the bobbin 120 due to winding pressure of the coil 130 may be prevented when the coil 130 is wound on the outer side surface of the bobbin 120.

Meanwhile, as necessary, the bobbin 120 having a multi-stepped structure as described above may be manufactured by an insert injection molding method. That is, the bobbin 120 may be manufactured by an insert injection molding method performed by inserting the stator core 110, which is formed of the plurality of core steel plate sets S1, S2, S3, and S4 or formed in a multi-stepped structure, into the mold, and injecting resin into the mold. In a case as described above, the process of assembling the bobbin 120 and the stator core 110 is omitted, and therefore there are technical merits in that productivity may be improved, and it is advantageous for mass production.

Hereinafter, the rotor assembly will be described in more detail with reference to the drawings.

Referring to FIG. 5, the rotor assembly 200 may include the shaft 210, and the pair of rotating plate assemblies 220.

The shaft 210 may be formed in a bar form that is extended in the front and rear direction or in the longitudinal direction thereof. The shaft 210 may be disposed at a central axis portion of the stator assembly 100, and rotated in a rotating magnetic field generated by the stator assembly 100. In addition, the front and rear ends of the shaft 210 are rotatably mounted on the front cover 320 or the rear cover 330 of the housing assembly 300, respectively. A description thereof will be amplified with reference to FIGS. 37 and 39 that will be described below.

The pair of rotating plate assemblies 220 causes an interaction in a rotating magnetic field so as to provide rotating drive force to the shaft 210, and may be fastened to the shaft 210, respectively, so as to be rotated together with the shaft 210. In addition, the pair of rotating plate assemblies 220 may be disposed to interpose the stator assembly 100 therebetween so as to be spaced apart from each other in the front and rear direction of the shaft 210 at a predetermined interval.

Because the pair of rotating plate assemblies 220 may be formed to be identical with or similar to each other, the following description will be amplified in more detail on the basis of a single rotating plate assembly 220.

Figure 18:
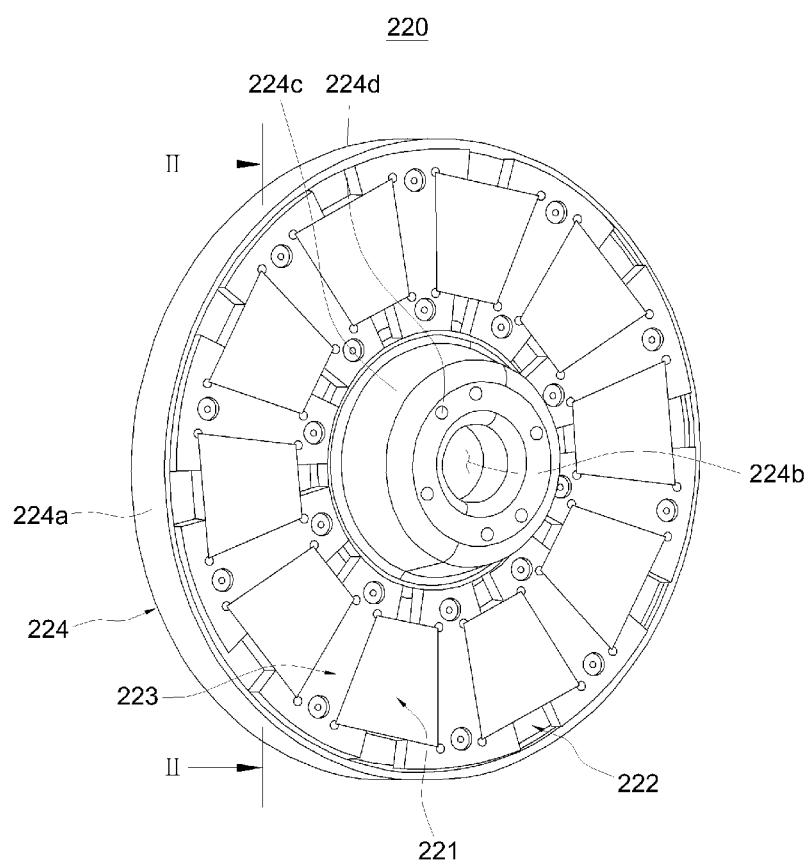
FIG. 18 is a perspective view illustrating a rotating plate assembly according to the exemplary embodiment of the present invention.
Figure 19:
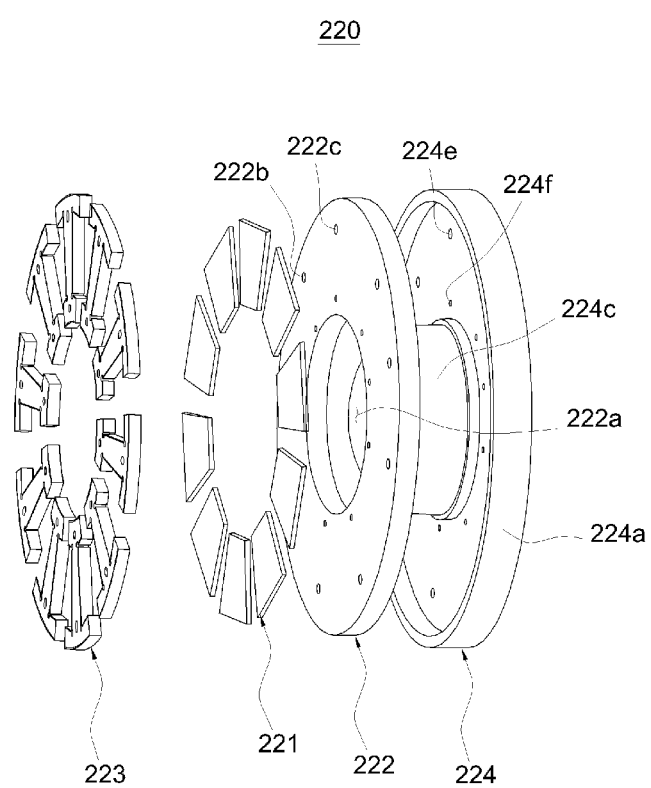
FIG. 19 is an exploded perspective view illustrating the rotating plate assembly according to the exemplary embodiment of the present invention.

FIG. 18 is a perspective view illustrating the rotating plate assembly according to the exemplary embodiment of the present invention. FIG. 19 is an exploded perspective view illustrating the rotating plate assembly according to the exemplary embodiment of the present invention.

Referring to FIGS. 18 and 19, the rotating plate assembly 220 according to the present exemplary embodiment may include a magnet member 221, a rotor core 222, a magnet fixing unit 223, and a rotating disk 224.

The magnet member 221 may be formed in an approximately trapezoidal form. Here, a short opposite side of the magnet member 221 may be disposed toward the radial inner side thereof. Alternatively, the magnet member 221 may be formed to have a width that becomes narrower toward the radial inner side thereof. The reason is for circumferentially or radially disposing a plurality of magnet members 221 to form a circular loop form or a ring form, as a whole.

The magnet member 221 may be provided in plural numbers. For example, in a case of the present exemplary embodiment, the ten magnet members 221 may be provided for each of the rotating plate assemblies 220. The plurality of magnet members 221 may be circumferentially or radially disposed so as to form a circular loop form or a ring form, as a whole. The disposition form of the magnet members 221 corresponds to the disposition form of the stator cores 110 that are formed in a circular loop form or a ring form. However, of course, the number of the magnet members 221 may be variously increased or decreased as necessary.

The rotor core 222 may be formed in a circular plate form in which a through hole 222a is provided in a central portion of the rotor core 222. The plurality of magnet members 221 may be circumferentially or radially disposed on one side surface of the rotor core 222.

The rotor core 222 may be provided with first and second core fixing holes 222b and 222c. The first core fixing hole 222b may be disposed at an inner circumferential side or a radial inner side of the rotor core 222, and the second core fixing hole 222c may be disposed at an outer circumferential side or a radial outer side of the rotor core 222. In addition, the first and second core fixing holes 222b and 222c may be provided in plural numbers. The plurality of first and second core fixing holes 222b and 222c may be circumferentially or radially disposed along a circumference of the rotor core 222.

Fastening means such as bolts, pins, or the like are inserted into and fastened to the first and second core fixing holes 222b and 222c so as to couple the rotor core 222, the magnet fixing unit 223, and the rotating disk 224 to each other. A description thereof will be amplified in respect to the magnet fixing unit 223 and the rotating disk 224 that will be described below.

Meanwhile, the magnet fixing unit 223 fixes the magnet member 221 to the rotor core 222. The magnet fixing units 223 may fix and support the magnet members 221, which are disposed on the rotor core 222, in an axial direction or in a radial direction. The magnet fixing unit 223 may be provided in plural numbers in accordance with the number of the magnet members 221. A description regarding the magnet fixing unit 223 will be amplified with reference to FIG. 20 that will be described below.

The rotating disk 224 may be fastened to the rotor core 222, and fastens the rotating plate assembly 220 to the shaft 210. A description regarding the fastening of the rotating disk 224 and the shaft 210 will be amplified with reference to FIG. 26 that will be described below.

The rotating disk 224 may be formed in a circular plate form corresponding to the rotor core 222. A disk flange 224a may be formed on an edge of the rotating disk 224 so as to protrude toward the rotor core 222. The reason is for accommodating the rotor core 222 and the like in the rotating disk 224 so as to be radially supported by the disk flange 224a.

In addition, a shaft fastening hole 224b may be provided in a central portion of the rotating disk 224. One side of the shaft 210 may be inserted into and fastened to the shaft fastening hole 224b.

Here, an outer circumferential portion of the shaft fastening hole 224b may be formed to predeterminedly protrude toward the rotor core 222, which is fastened to the rotating disk 224. In other words, in the rotating disk 224, a periphery of the shaft fastening hole 224b may predeterminedly protrude toward the front so as to form a protruding portion 224c.

The protruding portion 224c may be inserted into and fastened to the through hole 222a in the central portion of the rotor core 222 when the rotating disk 224 and the rotor core 222 are fastened. In addition, a shaft fixing hole 224d may be provided in one side surface of the protruding portion 224c. The shaft fixing hole 224d is provided to fasten the shaft 210 and the rotating disk 224, and may be provided in one side surface of the protruding portion 224c in plural numbers circumferentially or radially. The fastening of the shaft 210 and the rotating disk 224 through the shaft fixing hole 224d will be described below with reference to FIG. 26.

In addition, the rotating disk 224 may be provided with first and second disk fixing holes 224f and 224e. The first and second disk fixing holes 224f and 224e correspond to the first and second core fixing holes 222b and 222c that are provided in the rotor core 222, and fastening means such as bolts, pins, or the like are inserted into and fastened to the first and second disk fixing holes 224f and 224e so as to fasten the rotating disk 224 to the rotor core 222 and the magnet fixing unit 223.

The first disk fixing hole 224f may be disposed at the inner circumferential side or the radial inner side of the rotating disk 224, and the second disk fixing hole 224e may be disposed at the outer circumferential side or the radial outer side of the rotating disk 224, so as to correspond to the aforementioned first and second core fixing holes 222b and 222c. In addition, the first and second disk fixing hole 224f and 224e may be provided in plural numbers. The plurality of first and second disk fixing holes 224f and 224e may be circumferentially or radially disposed along a circumference of the rotating disk 224.

Hereinafter, a description regarding the magnet fixing unit will be amplified with reference to the drawings.

Figure 20:
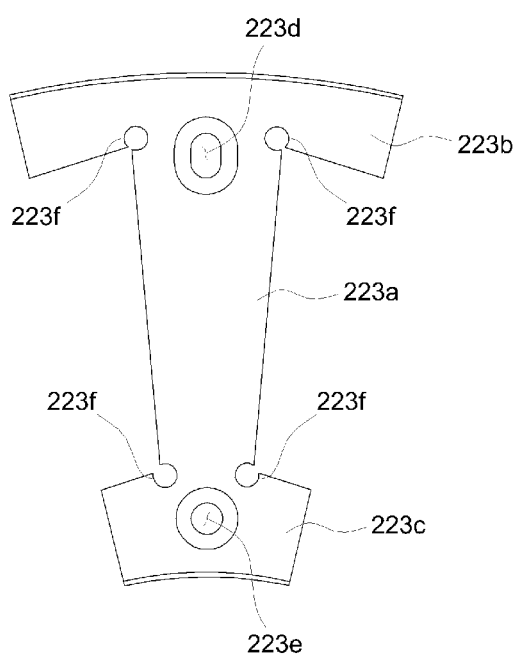
FIG. 20 is a front view illustrating a magnet fixing unit according to the exemplary embodiment of the present invention.
Figure 21:
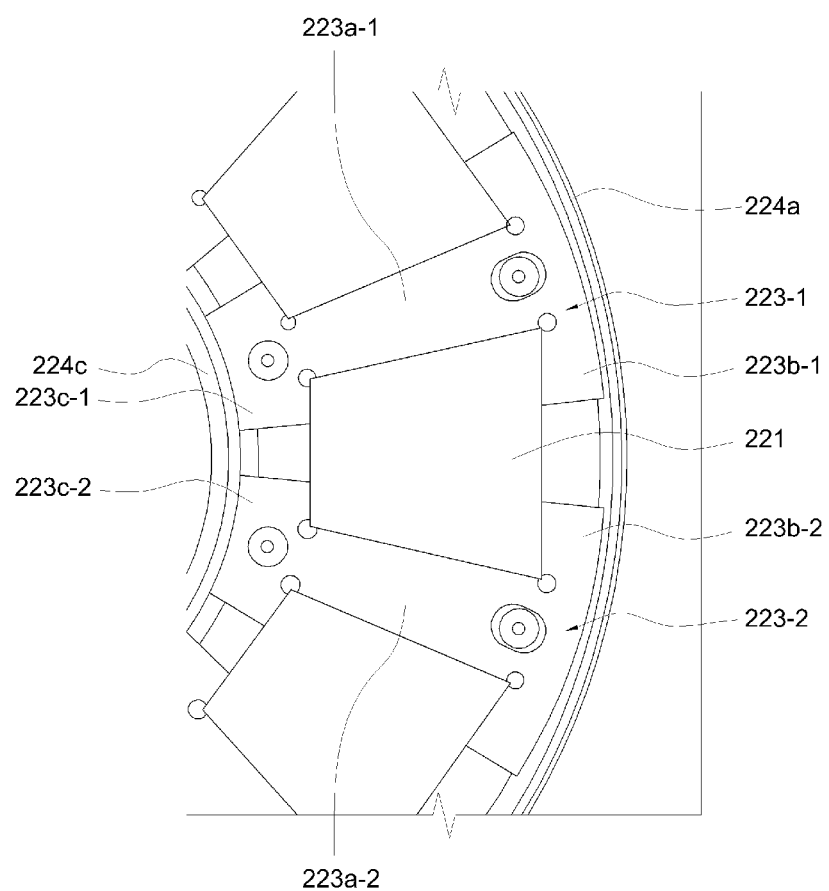
FIG. 21 is a front view illustrating a magnet member fixing structure of the magnet fixing unit according to the exemplary embodiment of the present invention.

FIG. 20 is a front view illustrating the magnet fixing unit according to the exemplary embodiment of the present invention. FIG. 21 is a front view illustrating the magnet member fixing structure of the magnet fixing unit according to the exemplary embodiment of the present invention.

Referring to FIGS. 20 and 21, the magnet fixing unit 223 is provided to fix and support the magnet member 221 to the rotor core 222, and may be formed in an approximately 'I' form. The magnet fixing unit 223 may be provided in plural numbers in accordance with the number of the magnet members 221, and the plurality of magnet fixing units 223 is disposed between the magnet members 221, respectively, so as to fix and support the magnet member 221.

The magnet fixing unit 223 may include a body portion 223a, and inner and outer support ribs 223c and 223b which are provided on both ends of the body portion 223a.

The body portion 223a is provided to fix and support the magnet member 221 circumferentially, and may be formed to be predeterminedly extended in a radial direction. One side surface of the body portion 223a comes into contact with or into close contact with one side surface of the magnet member 221 (see FIG. 18).

The inner and outer support ribs 223c and 223b are provided to fix and support the magnet member 221 radially, and the inner support rib 223c may be provided on a radial inner side end of the body portion 223a, and the outer support rib 223b may be provided on a radial outer side end of the body portion 223a. The inner and outer support ribs 223c and 223b may be formed to be predeterminedly and circumferentially extended from an inner side end or an outer side end of the body portion 223a so as to prevent the magnet member 221 from being radially moved away.

In addition, the magnet fixing unit 223 may be provided with first and second unit fixing holes 223e and 223d. The first and second unit fixing holes 223e and 223d correspond to the first and second core fixing holes 222b and 222c that are provided in the rotor core 222, and the first and second disk fixing holes 224f and 224e that are provided in the rotating disk 224. The first unit fixing hole 223e may be disposed at the inner circumferential side or the radial inner side of the magnet fixing unit 223, and the second unit fixing hole 223d may be disposed at the outer circumferential side or the radial outer side of the magnet fixing unit 223. Fastening means such as bolts, pins, or the like are inserted into and fastened to the first and second unit fixing holes 223e and 223d so as to couple the magnet fixing unit 223 to the rotor core 222 and the rotating disk.

When describing a fixing structure for the magnet member 221 by the magnet fixing unit 223 with reference to FIG. 21, the magnet member 221 is disposed between a pair of magnet fixing units 223-1 and 223-2 so as to be fixed and supported by the magnet fixing units 223-1 and 223-2.

More specifically, when the magnet fixing unit 223-1, which is disposed at one side of the magnet member 221, is referred to as a 'first magnet fixing unit 223-1', and the magnet fixing unit 223-2, which is disposed at the other side of the magnet member 221, is referred to as a 'second magnet unit 223-2', one side surface of the magnet member 221 comes into close contact with a first body portion 223a-1 of the first magnet fixing unit 223-1, and the other side surface thereof comes into close contact with a second body portion 223a-2 of the second magnet fixing unit 223-2. Therefore, the magnet member 221 may be circumferentially fixed and supported between the first and second body portions 223a-1 and 223a-2.

In addition, a radial outer side surface, that is, a long opposite side of the magnet member 221 may supported by a first outer support rib 223b-1 of the first magnet fixing unit 223-1 and a second outer support rib 223b-2 of the second magnet fixing unit 223-2, and a radial inner side surface, that is, a short opposite side of the magnet member 221 may be supported by a first inner support rib 223c-1 of the first magnet fixing unit 223-1 and a second inner support rib 223c-2 of the second magnet fixing unit 223-2. Therefore, the magnet member 221 may be radially fixed and supported between the first and second outer support ribs 223b-1 and 223b-2 and the first and second inner support ribs 223c-1 and 223c-2.

Meanwhile, the magnet member 221 may be deformed by an increase in temperature when the motor is driven. For example, the magnet member 221 may be thermally expanded due to an increase in temperature, and the thermal expansion of the magnet member 221 may cause damage to the magnet fixing unit 223 that supports the magnet member 221.

In consideration of the foregoing, the magnet fixing unit 223 according to the present exemplary embodiment may be formed in order to be able to cope with the thermal expansion or the deformation of the magnet member 221.

First, referring to FIG. 20, in the magnet fixing unit 223, an edge groove 223f may be formed in each of the edge portions where the body portion 223a and the inner and outer support ribs 223b adjoin each other. The edge groove 223f allows the inner and outer support ribs 223b to be predeterminedly deformed when the magnet member 221 is thermally expanded or deformed, thereby preventing damage to the magnet fixing unit 223.

In addition, because the edge groove 223f is disposed to correspond to the edge portion of the magnet member 221 (see FIG. 21), the magnet fixing unit 223 may also be prevented from being damaged due to the edge of the magnet member 221 when the magnet fixing unit 223 is fastened. Furthermore, the edge groove 223f may also perform a function of facilitating assembly of the magnet fixing unit 223 by providing a predetermined clearance to the edge portion of the magnet member 221.

Meanwhile, the first and second unit fixing holes 223e and 223d, which are provided in the magnet fixing unit 223, may be formed as a long hole in order to cope with the thermal expansion or the deformation of the magnet member 221. Alternatively, the first and second unit fixing holes 223e and 223d may be formed as a long hole that is predeterminedly and radially extended. The first and second unit fixing holes 223e and 223d, which are formed to be radially extended, may absorb the radial thermal expansion of the magnet member 221.

Meanwhile, in a case of the present exemplary embodiment, a case is exemplified in which only the second unit fixing hole 223d is formed in a long hole form, but of course, the first unit fixing hole 223e or all of the first and second unit fixing holes 223e and 223d may be formed in a long hole form.

In addition, referring to FIG. 21, the magnet fixing unit 223 and another adjacent magnet fixing unit 223 may be disposed so that the inner and outer support ribs 223b and 223c are circumferentially spaced apart from each other at a predetermined interval.

That is, the first outer support rib 223b-1 of the first magnet fixing unit 223-1 may be disposed to be circumferentially spaced apart from the second outer support rib 223b-2 of the adjacent second magnet fixing unit 223-2 at a predetermined interval, and the first inner support rib 223c-1 of the first magnet fixing unit 223-1 may also be disposed to be circumferentially spaced apart from the second inner support rib 223c-2 of the adjacent second magnet fixing unit 223-2 at a predetermined interval.

The separation disposition between the inner and outer support ribs 223b and 223c is for coping with the circumferential thermal expansion or the deformation of the magnet member 221.

Moreover, the inner and outer support ribs 223b and 223c of each of the magnet fixing units 223 may be disposed to be spaced apart from the disk flange 224a or the protruding portion 224c at a predetermined interval.

That is, when describing the first magnet fixing unit 223-1 as an example, the first inner support rib 223c-1 of the first magnet fixing unit 223-1 is disposed toward the protruding portion 224c of the rotating disk 224, and the first outer support rib 223b-1 of the first magnet fixing unit 223-1 is disposed toward the disk flange 224a of the rotating disk 224.

Here, when the magnet member 221 is thermally and radially expanded, the first inner support rib 223c-1 or the first outer support rib 223b-1 may come into contract with and interfere with the protruding portion 224c or the disk flange 224a, and thus the first inner support rib 223c-1 or the first outer support rib 223b-1 is disposed to be spaced from the protruding portion 224c or the disk flange 224a at a predetermined interval. Therefore, even when the magnet member 221 is radially and thermally expanded, damage to the first magnet fixing unit 223-1 due to the protruding portion 224c or the disk flange 224a may be prevented.

Figure 22:
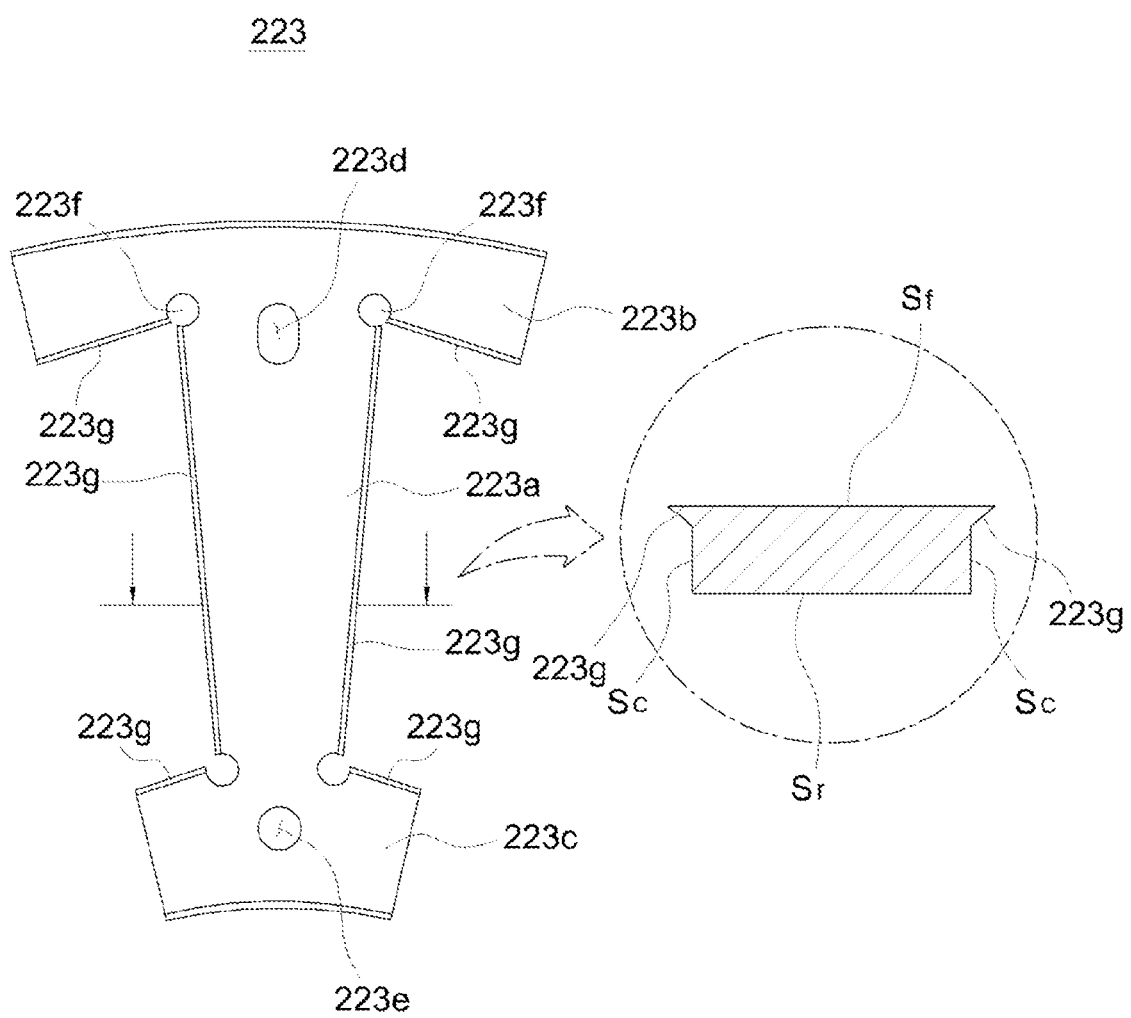
FIG. 22 is a rear view of the magnet fixing unit according to the exemplary embodiment of the present invention.
Figure 23:
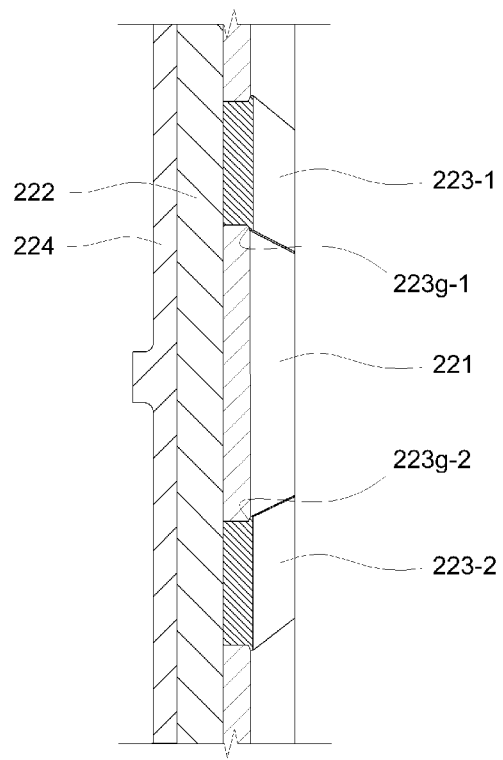
FIG. 23 is a partial cross-sectional view of the rotating plate assembly according to the exemplary embodiment of the present invention.

FIG. 22 is a rear view of the magnet fixing unit according to the exemplary embodiment of the present invention. FIG. 23 is a partial cross-sectional view of the rotating plate assembly according to the exemplary embodiment of the present invention.

It is noted that FIG. 23 is a cross-sectional view taken along line II-II depicted in FIG. 18.

Referring to FIGS. 22 and 23, the magnet fixing unit 223 may be provided with inclined surfaces 223g in order to support the magnet member 221 in an axial direction thereof. The inclined surfaces 223g may be formed along both side surfaces of the body portion 223a where the body portion 223a comes into contact with the magnet member 221. In addition, the inclined surface 223g may be formed along a surface where the outer support rib 223b comes into contact with the magnet member 221, or a surface where the inner support rib 223c comes into contact with the magnet member 221.

The inclined surfaces 223g may be entirely or partially formed on the surface where the body portion 223a and the like come into contact with the magnet member 221. For example, referring to the cross-sectional view of FIG. 22, when one side surface where the magnet fixing unit 223 comes into contact with the rotor core 222 is referred to as a 'rear surface portion' Sr, and the opposite side thereof is referred to as a 'front surface portion' Sf, and a surface, which comes into contact with the magnet member 221, is referred to as a 'contact surface' Sc, the inclined surface 223g may be formed over the entire contact surface Sc, or partially formed on only a portion of the contact surface Sc, which is adjacent to the front surface portion Sf, that is, only an upper end portion of the cross-sectional view of FIG. 22. In a case of the present exemplary embodiment, a case is exemplified in which the inclined surface 223g is partially formed on only the portion which is adjacent to the front surface portion Sf.

In a case as describe above, the magnet member 221 may be fixed and supported in the axial direction thereof by being caught by the inclined surface 223g. That is, as illustrated in FIG. 23, the front surface portion of the magnet member 221 is supported in the axial direction thereof by a first inclined surface 223g-1 of the first magnet fixing unit 223-1, which is disposed at one side thereof, and a second inclined surface 223g-2 of the second magnet fixing unit 223-2, which is disposed at the other side thereof, and the rear surface portion thereof comes into close contact with the rotor core 222. Therefore, the magnet member 221 may be fixed in the axial direction thereof, and the magnet member 221 may be prevented from being moved away in the axial direction thereof even at the time of a rotation drive.

Figure 24:
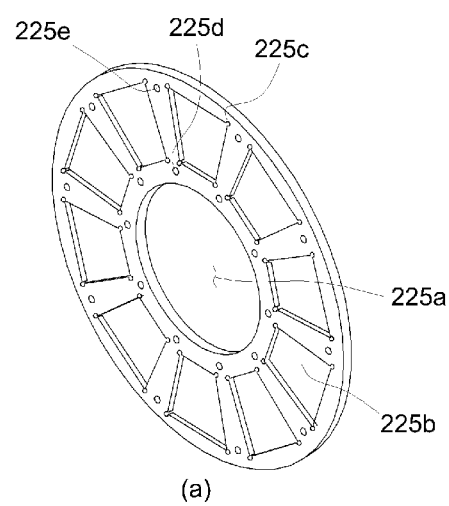
FIG. 24 is a perspective view illustrating a magnet fixing plate according to the exemplary embodiment of the present invention.
Figure 24:
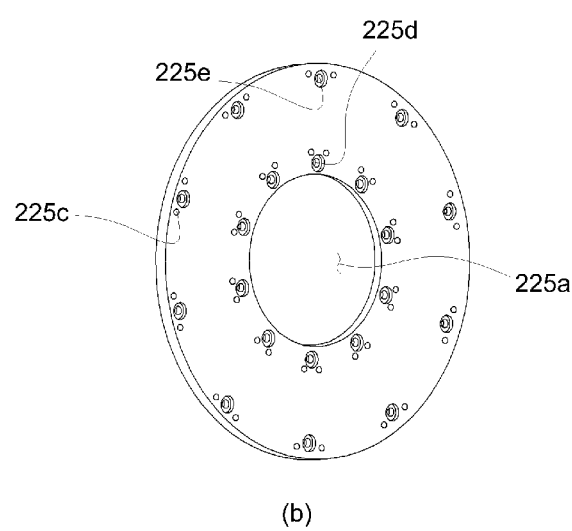

Meanwhile, a case has been exemplified above in which the magnet member 221 is fixed and supported to the rotor core 222 by the magnet fixing unit 223, but as necessary, the magnet member 221 may be fixed and supported to the rotor core 222 by a magnet fixing plate 225 (see FIG. 24).

Figure 25:
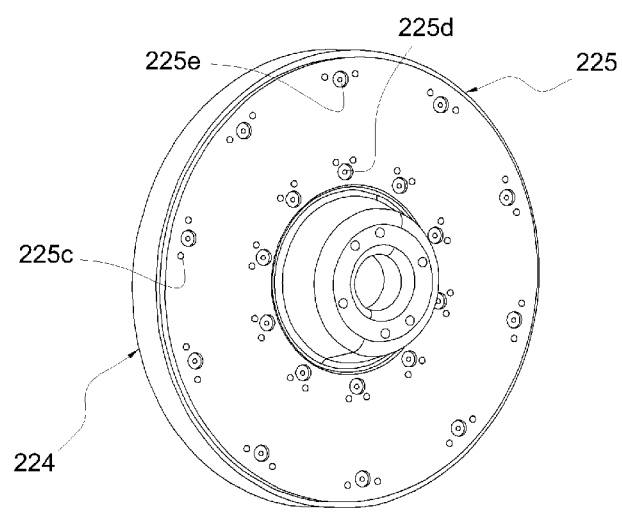
FIG. 25 is a perspective view illustrating an aspect in which the magnet fixing plate illustrated in FIG. 24 is fastened to a magnet member, a rotor core, and a rotating disk.
Figure 25:
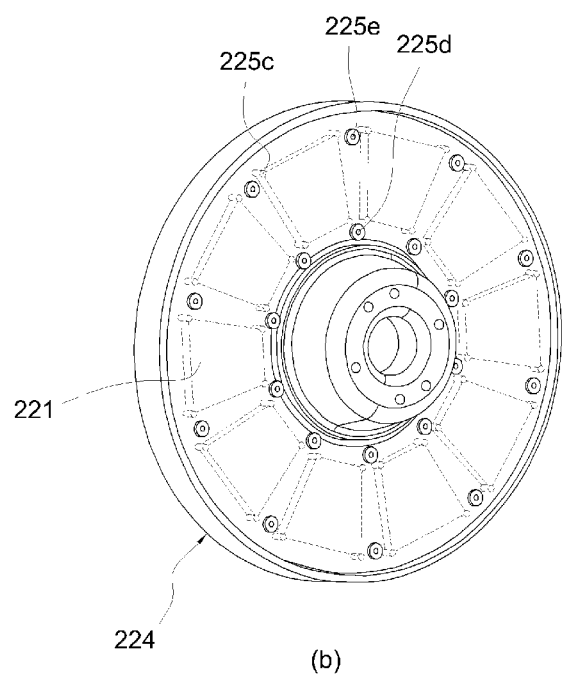

FIG. 24 is a perspective view illustrating a magnet fixing plate according to the exemplary embodiment of the present invention. FIG. 25 is a perspective view illustrating an aspect in which the magnet fixing plate illustrated in FIG. 24 is fastened to the magnet member, the rotor core, and the rotating disk.

It is noted that for explanatory convenience, FIG. 25(*b*) illustrates the magnet fixing plate 225 by seeing through a part thereof.

Referring to FIGS. 24 and 25, in order to fix and support the magnet member 221, the magnet fixing plate 225 may be used instead of the aforementioned magnet fixing unit 223. In a case of the aforementioned magnet fixing unit 223, the plurality of magnet fixing units 223 is required in accordance with the number of the magnet members 221, but in contrast, the magnet fixing plate 225 according to the present exemplary embodiment as a single member may fix and support the plurality of magnet members 221, and therefore there is a merit in that assembly work is simplified.

More specifically, the magnet fixing plate 225 may be formed in a circular plate form in which a through hole 225*a* is provided in a central portion of the magnet fixing plate 225. Alternatively, the magnet fixing plate 225 may be formed in a shape corresponding to that of the rotor core 222.

The magnet member 221 may be fastened to one side surface of the magnet fixing plate 225. In order to fasten the magnet member 221, a magnet seating groove 225*b* may be provided in one side surface of the magnet fixing plate 225. The magnet seating groove 225*b* may be formed in a shape corresponding to that of the magnet member 221 so that the magnet member 221 may be seated on the magnet seating groove 225*b*. For example, in a case of the present exemplary embodiment, the magnet seating groove 225*b* may be formed in an approximately trapezoidal form.

In addition, the magnet seating groove 225*b* may be provided in plural numbers in accordance with the number of the magnet members 221. The plurality of magnet seating grooves 225*b* may be disposed along a circumference of the magnet fixing plate 225 so as to be spaced apart from each other at predetermined intervals. Alternatively, the plurality of magnet seating grooves 225*b* may be circumferentially or radially disposed. The magnet members 221 are seated on the plurality of magnet seating grooves 225*b*, respectively.

Meanwhile, an edge groove 225*c* may be formed in each edge portion of the magnet seating groove 225*b*. The edge groove 225*c* may be disposed in each edge portion of the magnet member 221. The edge groove 225*c* is similar to the aforementioned edge groove 223*f* (see FIG. 20) of the magnet fixing unit 223, and prevents interference or damage due to a sharp edge when the magnet member 221 is assembled.

In addition, the magnet fixing plate 225 may be provided with first and second plate fixing grooves 225*d* and 225*e*. The first and second plate fixing grooves 225*d* and 225*e* correspond to the first and second core fixing holes 222*c* and 222*d* that are provided in the rotor core 222, and the first and second disk fixing holes 224*e* and 224*f* that are provided in the rotating disk 224 (see FIG. 19). The first plate fixing groove 225*d* may be disposed at an inner circumferential side or a radial inner side of the magnet fixing plate 225, and the second plate fixing groove 225*e* may be disposed at an outer circumferential side or a radial outer side of the magnet fixing plate 225. Fastening means such as bolts, pins, or the like are inserted into and fastened to the first and second plate fixing grooves 225*d* and 225*e* so as to couple the magnet fixing plate 225 to the rotor core 222 and the rotating disk 224.

The magnet fixing plate 225 as described above may fix the magnet member 221 to the rotor core 222. Here, unlike the aforementioned magnet fixing unit 223, the magnet fixing plate 225 as only a single member fixes and supports the plurality of magnet members 221. Therefore, assembly work may be simplified, and productivity may be improved.

Meanwhile, as necessary, the magnet fixing plate 225 may be manufactured by an insert molding method. That is, the magnet fixing plate 225 may be manufactured by disposing the plurality of magnet members 221 in a mold in a form that is designed in advance, and molding resin thereto. In this case, work of assembling the magnet fixing plate 225 and the magnet member 221 is omitted such that productivity may be further improved.

In addition, the magnet fixing plate 225 may be made of a material having a coefficient of thermal expansion similar to that of the magnet member 221 so as to cope with the thermal expansion or the deformation of the magnet member 221. In a case of the aforementioned insert molding method, the resin having a coefficient of thermal expansion similar to that of the magnet member 221 may be used. Moreover, of course, the aforementioned magnet fixing unit 223 may be made of a material having a coefficient of thermal expansion similar to that of the magnet member 221.

Hereinafter, a coupling structure between the rotating plate assembly and the shaft will be described in more detail with reference to the drawings.

Figure 26:
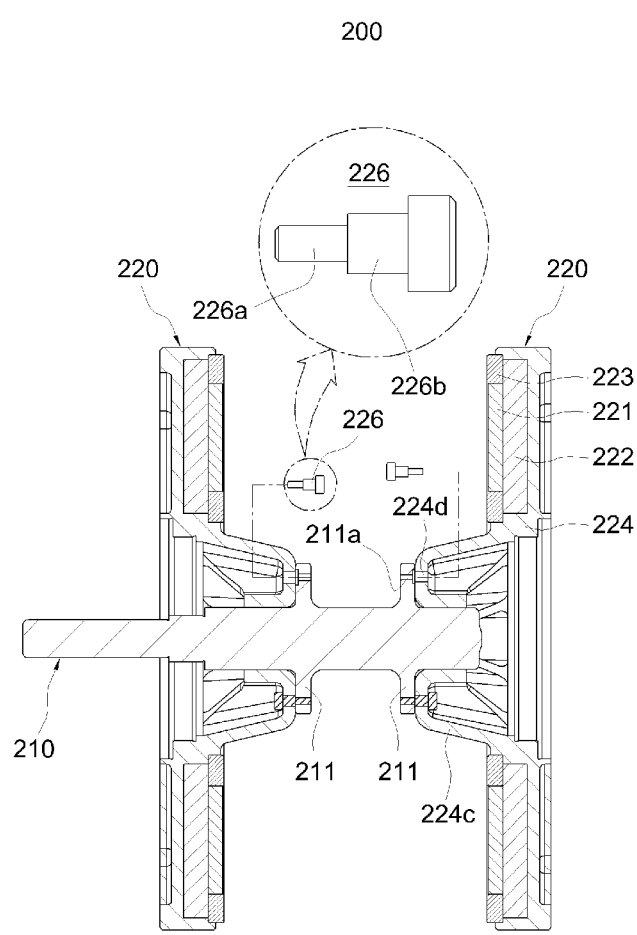
FIG. 26 is a side cross-sectional view of a rotor assembly according to the exemplary embodiment of the present invention.

FIG. 26 is a side cross-sectional view of the rotor assembly according to the exemplary embodiment of the present invention.

Referring to FIG. 26, the rotating plate assemblies 220 may be disposed at front and rear sides of the shaft 210 one by one, respectively. The pair of rotating plate assemblies 220, which is fastened to the front and rear sides of the shaft 210, may be disposed to interpose the stator assembly 100 therebetween and face each other (see FIG. 5). As described above, each of the rotating plate assemblies 220 may include the rotating disk 224, the rotor core 222, the magnet member 221, and the magnet fixing unit 223.

A fastening flange 211 may be provided on the shaft 210 in order to fasten the rotating plate assembly 220. A pair of fastening flanges 211 may be provided to correspond to the pair of rotating plate assemblies 220, and the pair of fastening flange 211 may be disposed to be spaced apart from each other along the longitudinal direction or the front and rear direction of the shaft 210 at a predetermined interval. The rotating plate assemblies 220 are fastened to the pair of fastening flanges 211, respectively.

The fastening flange 211 may be fastened to the rotating disk 224 of the rotating plate assembly 220. To this end, the fastening flange 211 may be provided with a bolt hole 211*a*. The bolt hole 211*a* corresponds to the shaft fixing hole 224*d* that is provided in the protruding portion 224*c* of the rotating disk 224. The fastening flange 211 may be provided with the plurality of bolt holes 211*a*, and the plurality of bolt hole 211*a* may be circumferentially or radially disposed at the fastening flange 211.

A pin bolt 226 is inserted and fastened to each of the bolt holes 211a so as to couple the fastening flange 211 and the rotating disk 224. The pin bolt 226 may be inserted into and fastened to the bolt hole 211a that is provided in the fastening flange 211, and the shaft fixing hole 224d that is provided in the protruding portion 224c. Here, the pin bolt 226 may be inserted and fastened from an inner side of the protruding portion 224c toward the fastening flange 211. The reason is for preventing a bolt head or the like of the pin bolt 226 from being exposed to the outside.

The pin bolt 226 may include a bolt portion 226a which is accommodated in the bolt hole 211a, and a position determination portion 226b which is accommodated in the shaft fixing hole 224d. The position determination portion 226b may be formed on one side end of the bolt portion 226a, and may be formed to have a predetermined radius larger than that of the bolt portion 226a. To correspond to the aforementioned configuration, the shaft fixing hole 224d may be formed to have a predetermined radius larger than that of the bolt hole 211a.

The bolt portion 226a is engaged with the bolt hole 211a by threading so as to fix and support the rotating disk 224 in the axial direction thereof. In addition, the position determination portion 226b may adjust an axial position between the rotating disk 224 and the fastening flange 211. That is, the axial position between the rotating disk 224 and the fastening flange 211 may be adjusted by adjusting a length of the position determination portion 226b.

Meanwhile, the pin bolt 226 may be provided in plural numbers. Each of the pin bolts 226 is inserted into and fastened to the corresponding bolt hole 211a and the corresponding shaft fixing hole 224d so as to fix the rotating disk 224 to the fastening flange 211 in the rotation direction thereof.

When the pin bolt 226 is fastened between the fastening flange 211 and the rotating disk 224 as described above, the rotating plate assembly 220 is fixed and supported to the shaft 210. That is, the shaft 210 penetrates the shaft fastening hole 224b at the center of the rotating disk 224, and the protruding portion 224c of the rotating disk 224 is coupled to the fastening flange 211, such that the rotating plate assembly 220 is fixed and supported to the shaft 210 in the axial direction and in the rotation direction thereof.

Hereinafter, the housing assembly will be described in more detail with reference to the drawings.

Referring to the aforementioned FIGS. 3 to 5, the housing assembly 300 may include the motor housing 310, the front cover 320, and the rear cover 330.

The motor housing 310 may be formed in a hollow cylindrical shape, as a whole. The stator assembly 100 may be accommodated in the motor housing 310. The housing fixing hole 311 may be provided in the motor housing 310 in order to fasten the stator assembly 100. The coupling structure between the motor housing 310 and the stator assembly 100 has been described with reference to FIG. 8.

A terminal 317 may be provided at one side of the motor housing 310. A lead wire 313 may be connected to the terminal 317. The lead wire 313 may be connected to the coil terminal 131 (see FIG. 6) of the stator assembly 100 in the terminal 317. The lead wire 313 may be provided in plural numbers in accordance with the number of the coil terminals 131.

The motor housing 310 may be provided with a coolant inlet unit 314 and a coolant outlet unit 315. The coolant inlet unit 314 allows a coolant to flow into the motor housing 310, and the coolant outlet unit 315 discharges the coolant, which has been used for cooling, to the outside of the motor housing 310. Here, the coolant inlet unit 314 may be disposed at an upper side of the motor housing 310, and the coolant outlet unit 315 may be disposed at a lower side of the motor housing 310, so that the coolant may flow on its own weight. In addition, the coolant may include cooling oil. A description regarding a cooling structure in the motor housing 310 will be amplified with reference to FIG. 33 that will be described below.

The front cover 320 may be fastened to the front surface portion of the motor housing 310 so as to shield the front surface portion of the motor housing 310. In addition, the front cover 320 may support a front end side of the rotor assembly 200 so that the front end side thereof is rotatable. A description regarding a support structure of the rotor assembly 200 by the front cover 320 will be amplified with reference to FIG. 37 that will be described below.

The rear cover 330 may be fastened to the rear surface portion of the motor housing 310 so as to shield the rear surface portion of the motor housing 310. In addition, the rear cover 330 may support a rear end side of the rotor assembly 200 so that the front end side thereof is rotatable. A description regarding a support structure of the rotor assembly 200 by the front cover 330 will be amplified with reference to FIG. 39 that will be described below.

Figure 27:
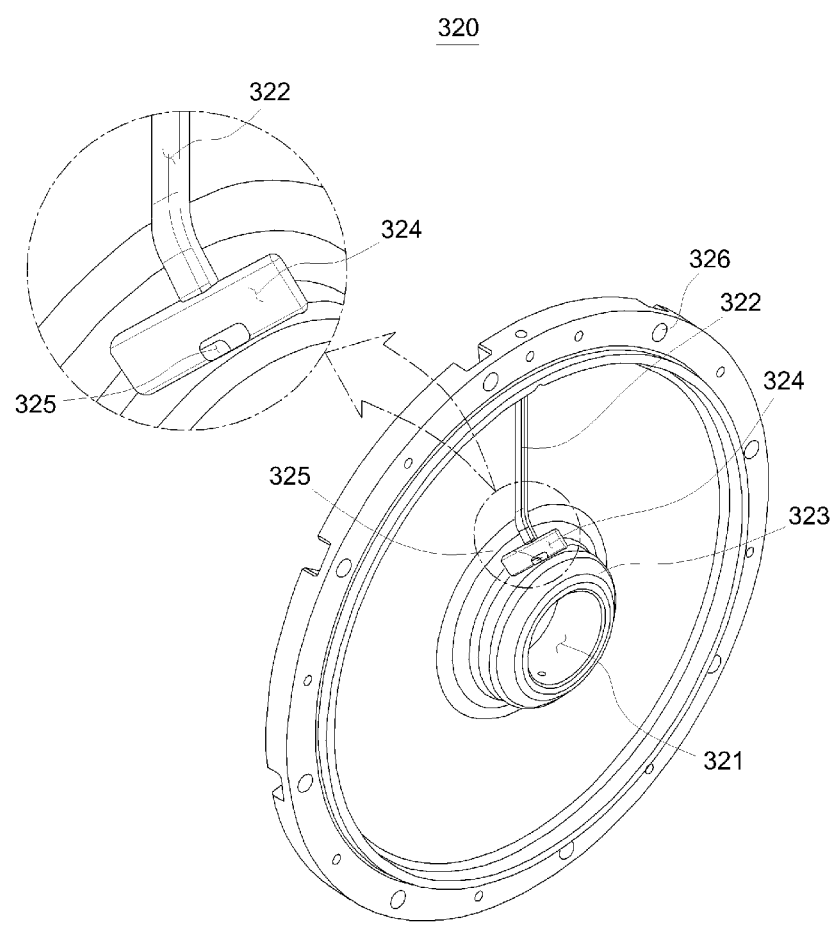
FIG. 27 is a perspective view illustrating a front cover according to the exemplary embodiment of the present invention.

FIG. 27 is a perspective view illustrating a front cover according to the exemplary embodiment of the present invention.

It is noted that FIG. 27 illustrates an aspect of the rear surface portion of the front cover 320 when seen from the inner side of the motor housing 310.

Referring to FIG. 27, the front cover 320 may be formed in an approximately circular plate form. A shaft fastening hole 321 may be formed in a central portion of the front cover 320. The front end of the shaft 210 of the rotor assembly 200 may be fastened to the shaft fastening hole 321. The front end of the shaft 210 may be exposed outward from the front cover 320 through the shaft fastening hole 321 (see FIG. 3). The exposed shaft 210 is connected to a load side to transmit rotating drive force to the load side.

The front cover 320 may be provided with a coolant flow groove 322 for a flow of the coolant. The coolant flow groove 322 may be formed in a rear surface portion of the front cover 320 in an up and down direction. Here, the rear surface portion refers to one side surface of the front cover 320, which is oriented toward an inner side of the motor housing 310. The coolant flow groove 322 may guide a flow of the coolant so that the coolant flowing through the coolant inlet unit 314 flows along the rear surface portion of the front cover 320. A description thereof will be amplified with reference to FIG. 33.

The front cover 320 may be provided with a protruding portion 323 at a periphery of the shaft fastening hole 321. The protruding portion 323 may be formed on the rear surface portion of the front cover 320 so as to protrude along an outer circumference of the shaft fastening hole 321.

A coolant collection groove 324 may be formed in an upper portion of the protruding portion 323. The coolant collection groove 324 temporarily stores the coolant that flows down along the coolant flow groove 322, and an upper portion of the protruding portion 323 may be formed in a concavely depressed form. In addition, a coolant flow hole 325 may be penetratively formed in a lower surface of the coolant collection groove 324. The coolant flowing down to the coolant collection groove 324 flows to the shaft 210 of a lower end of the protruding portion 323 through the coolant flow hole 325. A description thereof will be amplified with reference to FIG. 33.

Meanwhile, the front cover 320 may be provided with a cover fastening hole 326 for coupling with the motor housing 310. The cover fastening hole 326 may be provided in plural numbers, and the plurality of cover fastening holes 326 may be disposed to be spaced apart from each other along the outer circumferential portion of the front cover 320 at predetermined intervals. Fastening means such as a bolt, a pin, or the like is fastened to the cover fastening hole 326 so as to fix the front cover 320 to the motor housing 310.

Figure 28:
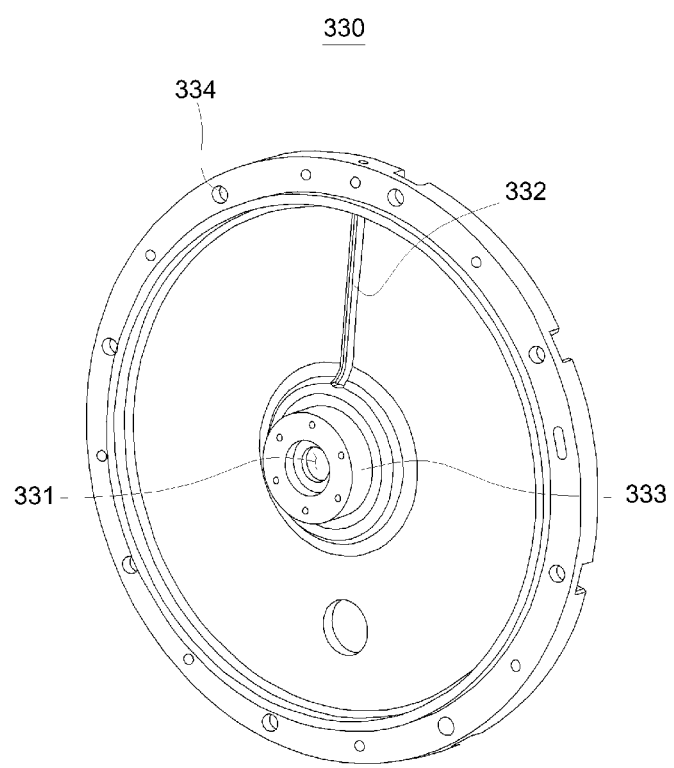
FIG. 28 is a perspective view illustrating a rear cover according to the exemplary embodiment of the present invention.

FIG. 28 is a perspective view illustrating a rear cover according to the exemplary embodiment of the present invention.

It is noted that FIG. 28 illustrates an aspect of the rear cover 330 when seen from the inner side of the motor housing 310, and illustrates the aspect on the basis of one surface of the rear cover 330, which is oriented toward the inner side of the motor housing 310.

Referring to FIG. 28, the rear cover 330 may be formed in an approximately circular plate form so as to correspond to the aforementioned front cover 320 A shaft fastening hole 331 may be formed in a central portion of the rear cover 330. The rear end of the shaft 210 of the rotor assembly 200 may be fastened to the shaft fastening hole 331 (see FIG. 5).

The rear cover 330 may be provided with a coolant flow groove 332 for a flow of the coolant. The coolant flow groove 332 may be formed in a front surface portion of the rear cover 330 in an up and down direction. Alternatively, the coolant flow groove 332 may be formed on one side surface of the rear cover 330, which is oriented toward the inner side of the motor housing 310, in an up and down direction. The coolant flow groove 332 may guide a flow of the coolant so that the coolant flowing through the coolant inlet unit 314 flows down to the lower side thereof. A description thereof will be amplified with reference to FIG. 33.

In addition, in the rear cover 330, a periphery of the shaft fastening hole 331 predeterminedly protrudes toward the front thereof so as to form a protruding portion 333. The protruding portion 333 may be formed on the front surface portion of the rear cover 330. Alternatively, the protruding portion 333 may be formed on one side surface of the rear cover 330, which is oriented toward the inner side of the motor housing 310. A bearing supporter 380 (see FIG. 40) for a bearing support structure of a rear end of the shaft 210 may be fastened to the protruding portion 333. A description regarding the bearing supporter 380 will be amplified with reference to FIG. 40.

Meanwhile, the rear cover 330 may be provided with a cover fastening hole 334 for coupling with the motor housing 310. The cover fastening hole 334 may be provided in plural numbers, and the plurality of cover fastening holes 334 may be disposed to be spaced apart from each other along the outer circumferential portion of the rear cover 330 at predetermined intervals. Fastening means such as a bolt, a pin, or the like is fastened to the cover fastening hole 334 so as to fix the rear cover 330 to the motor housing 310.

Figure 29:
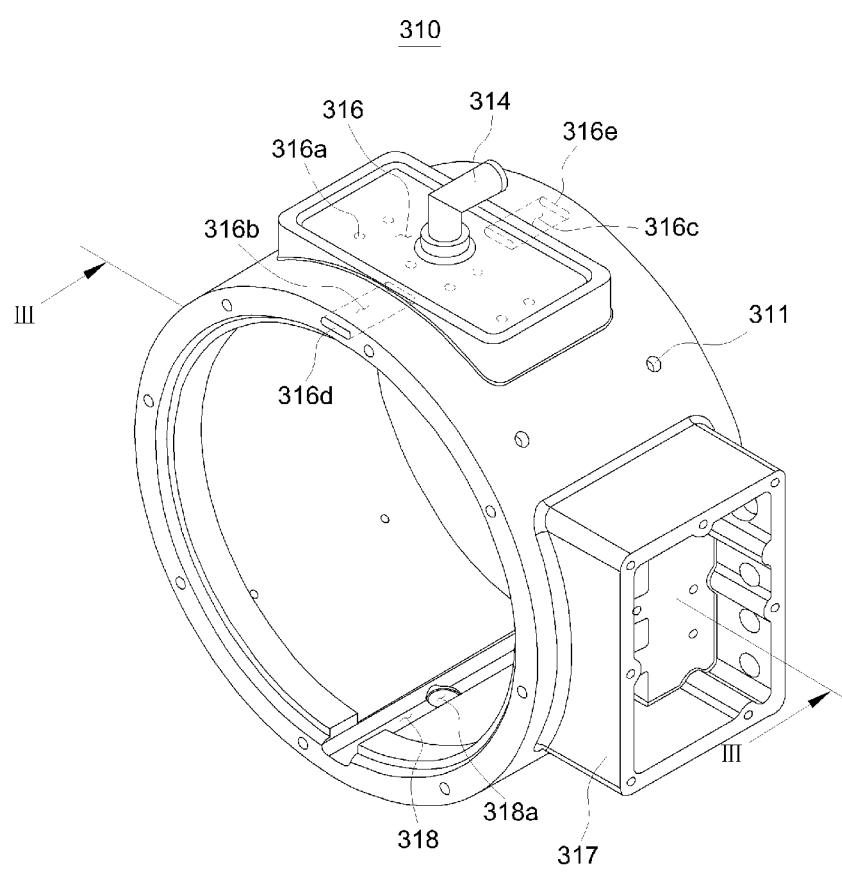
FIG. 29 is a first front perspective view illustrating a motor housing according to the exemplary embodiment of the present invention.
Figure 30:
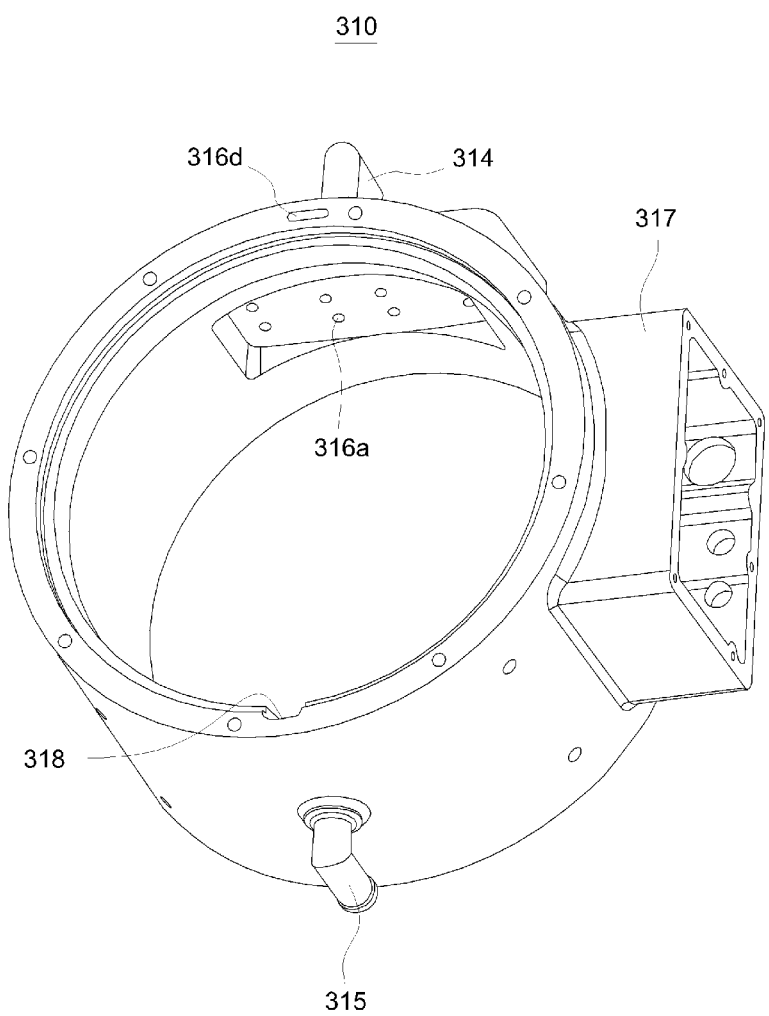
FIG. 30 is a second front perspective view illustrating the motor housing according to the exemplary embodiment of the present invention.
Figure 31:
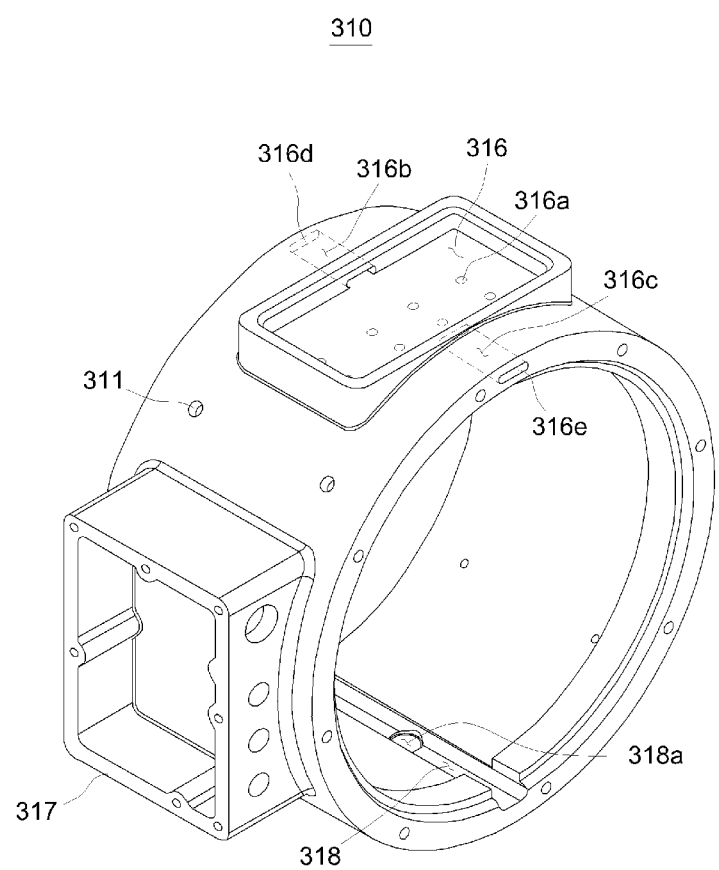
FIG. 31 is a rear perspective view illustrating the motor housing according to the exemplary embodiment of the present invention.

FIG. 29 is a first front perspective view illustrating the motor housing according to the exemplary embodiment of the present invention. FIG. 30 is a second front perspective view illustrating the motor housing according to the exemplary embodiment of the present invention. FIG. 31 is a rear perspective view illustrating the motor housing according to the exemplary embodiment of the present invention.

It is noted that FIG. 29 illustrates an aspect of the motor housing 310 when seen from a front upper side thereof, and FIG. 30 illustrates an aspect of the motor housing 310 when seen from a front lower side thereof.

Referring to FIGS. 29 to 31, a coolant distribution chamber 316 may be provided on the upper side of the motor housing 310. The coolant distribution chamber 316 may be communicated with the coolant inlet unit 314 such that the coolant may flow from the coolant inlet unit 314 into the coolant distribution chamber 316. The coolant flowing into the coolant distribution chamber 316 may be supplied to an interior of the motor housing 310 through the coolant distribution chamber 316, and may be used to lubricate or cool a bearing.

A coolant dropping hole 316a through which the coolant flowing through the coolant inlet unit 314 is dropped into the motor housing 310 may be formed in the bottom portion of the coolant distribution chamber 316. Here, the bottom portion of the coolant distribution chamber 316 may be formed in a flat plate form so that the coolant does not flow along an inner wall of the motor housing 310 or the like at the time of dropping the coolant as described above.

Figure 32:
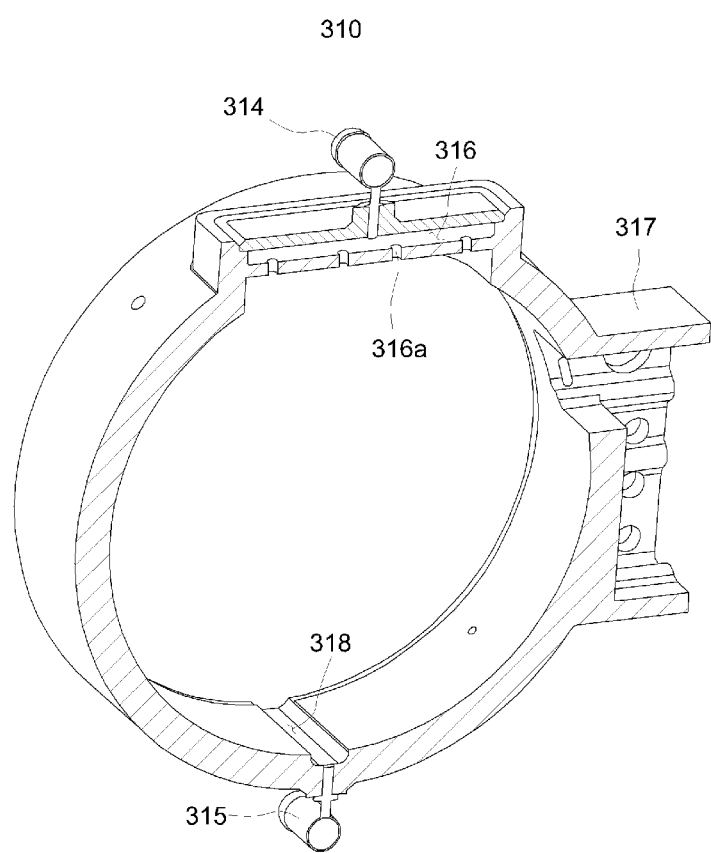
FIG. 32 is a cross-sectional view taken along line B-B depicted in FIG. 29.

FIG. 32 is a cross-sectional view taken along line III-III depicted in FIG. 29.

When amplifying the description with reference to FIG. 32, the coolant distribution chamber 316 may be provided on the upper side of the motor housing 310, and the plurality of coolant dropping holes 316a may be penetratively formed in the bottom portion of the coolant distribution chamber 316. Therefore, the coolant flowing into the coolant distribution chamber 316 through the coolant inlet unit 314 is dropped into the motor housing 310 through the coolant dropping hole 316a. The dropped coolant is used to cool the stator assembly 100, or the like.

Here, there is a possibility that the coolant passing through the coolant dropping hole 316a flows along the bottom portion of the coolant distribution chamber 316, or flows along the inner wall of the motor housing 310 in accordance with a form of the bottom portion of the coolant distribution chamber 316.

For example, unlike the state illustrated in FIG. 32, in a case in which the bottom portion of the coolant distribution chamber 316 is formed as a curved surface having the same curvature as the inner wall of the motor housing 310, the coolant passing through the coolant dropping hole 316a flows along the bottom portion of the coolant distribution chamber 316 or along the inner wall of the motor housing 310. Therefore, in this case, the coolant is not sufficiently dropped to the stator assembly 100 and the like, thereby degrading a cooling effect.

In order to resolve the aforementioned problem, in the coolant distribution chamber 316, the bottom portion in which the coolant dropping hole 316a is formed may be formed in a flat plate form. Alternatively, the bottom portion of the coolant distribution chamber 316 may be formed horizontally. Alternatively, the bottom portion of the coolant distribution chamber 316 may be formed vertically to a direction in which the coolant is dropped. This form of the bottom portion of the coolant distribution chamber 316 allows the coolant to be dropped vertically. Therefore, the dropped coolant falls into the motor housing 310 such that the coolant may be used to cool the stator assembly 100, thereby improving a cooling effect by the dropped coolant.

Referring to FIGS. 29 to 31, a coolant draining groove 318 may be provided in an inner side bottom portion of the motor housing 310. The coolant draining groove 318 is provided to collect and discharge to the outside the coolant which has been used to lubricate or cool the bearing, and may be formed in the inner side bottom portion of the motor housing 310 so as to be predeterminedly extended in the front and rear direction thereof. The coolant, which has been distributed by the coolant distribution chamber 316 and used to lubricate the bearing, or the coolant, which has been dropped from the coolant distribution chamber 316 and used for cooling, is collected in the coolant draining groove 318. A description thereof will be amplified with reference to FIG. 33.

In addition, a coolant discharge hole 318a, which is communicated with the coolant outlet unit 315, may be provided in the coolant draining groove 318. The coolant discharge hole 318a may be penetratively formed in the bottom portion of the motor housing 310, and discharges the coolant collected in the coolant draining groove 318 to the coolant outlet unit 315. In addition, as will be described below, the coolant outlet unit 315 discharges the coolant passing through the coolant discharge hole 318a to the outside of the apparatus.

Meanwhile, the motor housing 310 may be provided with first and second coolant distribution paths 316b and 316c that are communicated with the coolant distribution chamber 316. The first and second coolant distribution paths 316b and 316c may distribute and supply the coolant, which has been supplied to the coolant distribution chamber 316, to the front cover 320 and the rear cover 330, respectively.

More specifically, the first coolant distribution path 316b may be formed to be extended from the coolant distribution chamber 316 toward the front cover 320. The first coolant distribution path 316b is formed as a flow path having a form installed in the motor housing 310, and a front end thereof may be formed to be extended to a first coolant distribution opening 316d. The first coolant distribution opening 316d may be disposed at an upper end portion of the coolant flow groove 322 (see FIG. 27) that is provided in the front cover 320. Therefore, the coolant flowing through the first coolant distribution path 316b is discharged to the first coolant distribution opening 316d, and flows down to the lower side along the coolant flow groove 322 of the front cover 320.

Meanwhile, the second coolant distribution path 316c may be formed at the opposite side to the first coolant distribution path 316b so as to be extended toward the rear cover 330. The second coolant distribution path 316c may be formed to be extended to a second coolant distribution opening 316e positioned at a rear side of the motor housing 310. The second coolant distribution opening 316e corresponds to the coolant flow groove 330 (see FIG. 28) that is provided in the rear cover 330, and the coolant discharged through the second coolant distribution opening 316e flows down to the lower side along the rear cover 330.

Figure 33:
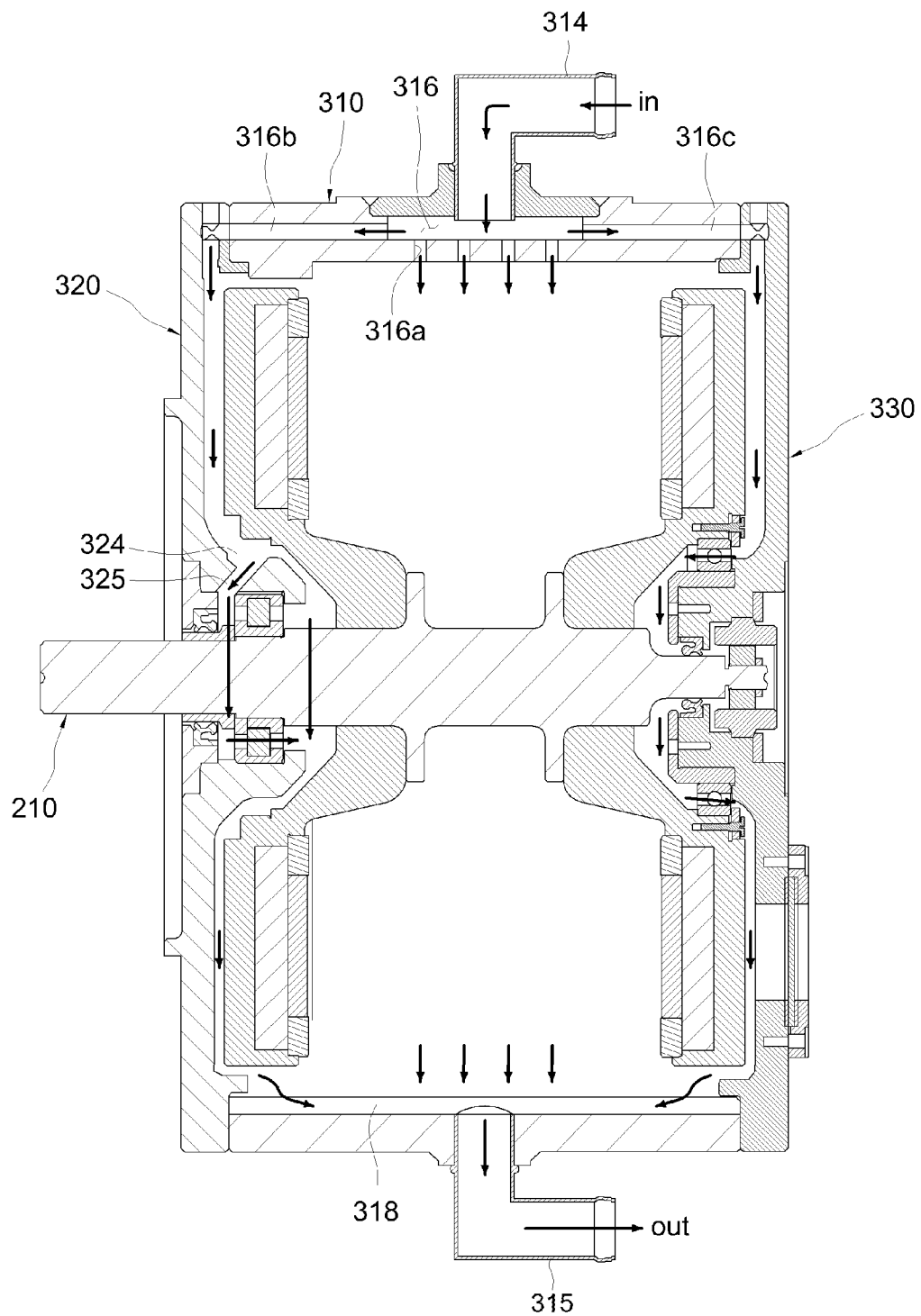
FIG. 33 is a side cross-sectional view illustrating a coolant flow path of a housing assembly according to the exemplary embodiment of the present invention.

Operations of the first and second coolant distribution paths 316b and 316c will be amplified with reference to FIG. 33.

Hereinafter, a structure for lubricating and cooling the bearing inside the motor housing will be described in more detail with reference to the drawings.

FIG. 33 is a side cross-sectional view illustrating the coolant flow path of the housing assembly according to the exemplary embodiment of the present invention.

It is noted that for explanatory convenience, FIG. 33 illustrates a configuration on the basis of the coolant flow path while omitting partial components such as the stator assembly 100 and the like, and the arrows depicted in the drawing indicate a flow direction of the coolant.

Referring to FIG. 33, the coolant, which is needed to lubricate or cool the bearing, is supplied to the coolant distribution chamber 316 through the coolant inlet unit 314. A part of the coolant, which is supplied to the coolant distribution chamber 316, flows along the first and second coolant distribution paths 316b and 316c, and another part of the coolant is dropped into the motor housing 310 through the coolant dropping hole 316a.

More specifically, the coolant flowing into the first coolant distribution path 316b flows toward the front cover 320 at the front end of the motor housing 310. In addition, the flowing coolant is discharged to the upper end of the coolant flow groove 322 (see FIG. 27) that is provided in the front cover 320, and the discharged coolant flows down to the lower side along the coolant flow groove 322. In addition, the coolant, which has flowed down to the lower side, is collected in the coolant collection groove 324 (see FIG. 27) that is provided in the lower end of the coolant flow groove 322, and then discharged to the shaft 210 through the coolant flow hole 325. The discharged coolant is used to lubricate a bearing part that supports the front end of the shaft 210, flows to the lower side on its own weight, and then flows down to the bottom portion of the motor housing 310. Meanwhile, the coolant, which has flowed down to the bottom portion of the motor housing 310, is collected in the coolant draining groove 318, and discharged to the outside via the coolant outlet unit 315.

Meanwhile, the coolant flowing into the second coolant distribution path 316c flows toward the rear cover 330 at the rear end of the motor housing 310. In addition, similarly to a case of the aforementioned first coolant distribution path 316b, the flowing coolant flows down to the lower side along the coolant flow groove 332 (see FIG. 28) that is provided in the rear cover 330, and is used to lubricate a bearing part that supports the rear end of the shaft 210. The used coolant flows down to the bottom portion of the motor housing 310 to be collected in the coolant draining groove 318, and is discharged to the outside via the coolant outlet unit 315.

As described above, the housing assembly 300 according to the present exemplary embodiment may be formed so that the supplied coolant is distributed to the front cover 320 or the rear cover 330 side through the coolant distribution chamber 316. Therefore, the coolant may be uniformly distributed and supplied to the front cover 320 and the rear cover 330 sides, thereby appropriately performing a function of lubricating front and rear end side bearings by the coolant.

Meanwhile, the coolant flowing into the coolant dropping hole 316a in the bottom portion of the coolant distribution chamber 316 is dropped into the motor housing 310. Here, as described above, the bottom portion of the coolant distribution chamber 316 is formed vertically to the direction in which the coolant is dropped, thereby minimizing the phenomenon that the coolant flows along the bottom portion of the coolant distribution chamber 316 or the inner wall of the motor housing 310. The coolant, which has been dropped into the motor housing 310, cools the stator assembly 100, and then flows down to the bottom portion of the motor housing 310 on its own weight. In addition, the coolant, which has flowed down to the bottom portion of the motor housing 310, is collected in the coolant draining groove 318 in the bottom portion of the motor housing 310, and discharged to the outside via the coolant outlet unit 315.

Meanwhile, in a case of the present exemplary embodiment, a case is exemplified in which the coolant is dropped to the stator assembly to cool the stator assembly, but as necessary, a manner may also be used in which the coolant flows around the stator assembly to cool the stator assembly.

Figure 34:
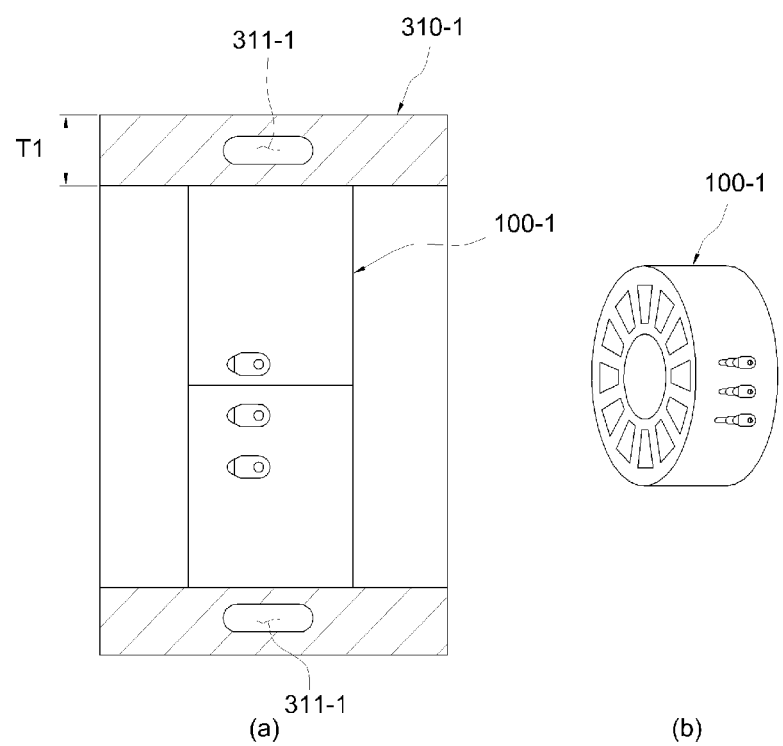
FIG. 34 is a schematic view illustrating a cooling structure of a motor housing and a stator assembly according to another exemplary embodiment of the present invention.

FIG. 34 is a schematic view illustrating a cooling structure of the motor housing and the stator assembly according to another exemplary embodiment of the present invention.

FIG. 34 illustrates a manner in which the coolant flows around a stator assembly 100-1 to cool the stator assembly 100-1.

Referring to FIG. 34, a cooling flow path 311-1 may be provided inside a motor housing 310-1. The cooling flow path 311-1 may be formed along a circumferentially circumference of the motor housing 310-1. In addition, the stator assembly 100-1 is mounded in the motor housing 310-1, and may be disposed adjacent to the cooling flow path 311-1 or an inner circumferential surface of the motor housing 310-1. In this case, the coolant flows along the cooling flow path 311-1 such that an interior of the motor housing 310-1 or the stator assembly 100-1 may be cooled.

However, in a case of the foregoing, because the cooling flow path 311-1 needs to be provided inside the motor housing 310-1, a thickness T1 of the motor housing 310-1 is increased. In addition, this increase in thickness T1 of the motor housing 310-1, consequently, may cause an increase of the entire radial size of the motor housing 310-1.

For reference, it is noted that the stator assembly 100-1 illustrated in FIG. 34(b) is illustrated as an example of the stator assembly 100' manufactured by an insert injection molding method (see FIG. 9).

Figure 35:
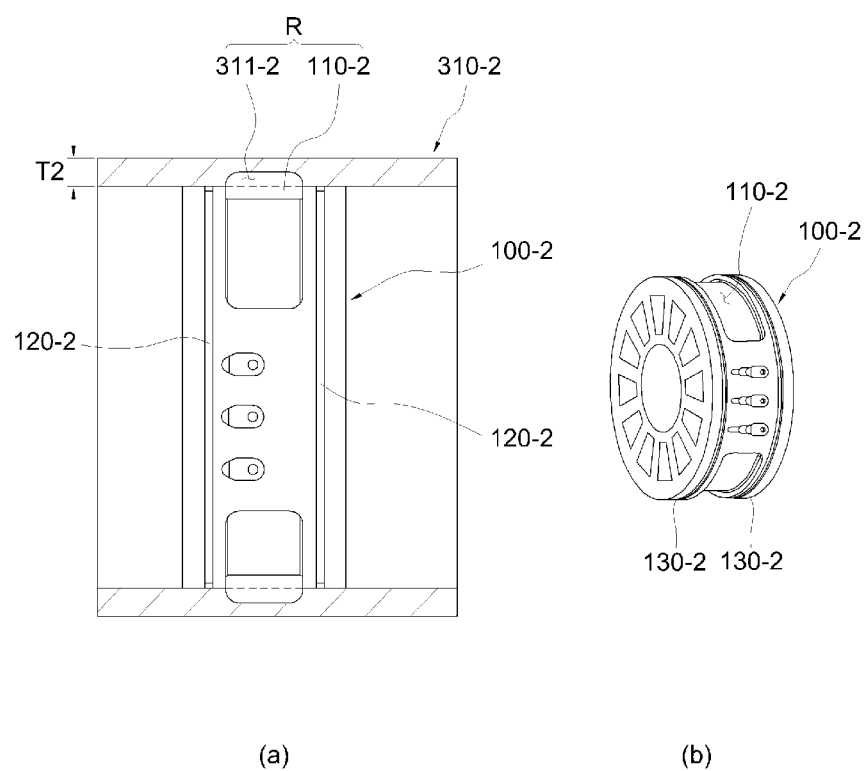
FIG. 35 is a schematic view illustrating a modified example of the motor housing and the stator assembly illustrated in FIG. 34.

FIG. 35 is a schematic view illustrating a modified example of the motor housing and the stator assembly illustrated in FIG. 34.

In order to prevent an increase in thickness T1 of the motor housing 310-1 as illustrated in FIG. 34, a method may be considered in which first and second cooling grooves 311-2 and 110-2 are provided in a motor housing 310-2 and a stator assembly 100-2, respectively.

More specifically, according to the present modified example, the first cooling groove 311-2 may be provided in the inner circumferential surface of the motor housing 310-2. Unlike the aforementioned cooling flow path 311-1, the first cooling groove 311-2 is not installed inside the motor housing 310 in a pipe form, but may be formed to have one surface formed in an opened groove form. In addition, the first cooling groove 311-2 may be formed to be circumferentially extended along the inner circumferential surface of the motor housing 310-2.

In addition, the second cooling groove 110-2 may be provided in the outer circumferential surface of the stator assembly 100-2. The second cooling groove 110-2 corresponds to the first cooling groove 311-2, and may be formed to be circumferentially extended along the outer circumferential surface of the stator assembly 100-2. In a case in which the stator assembly 100-2 is manufactured by an insert injection molding method, the second cooling groove 110-2 may be applied to the resin part at the time of performing the insert injection molding method (see FIG. 9).

The first and second cooling grooves 311-2 and 110-2 may form a single cooling flow path R by being coupled to each other when the stator assembly 100-2 is mounted in the motor housing 310-2. In other words, the first cooling groove 311-2, which is disposed at the outer circumferential side, and the second cooling groove 110-2, which is disposed at the inner circumferential side, meet together so as to form the cooling flow path R for a flow of the coolant. In this case, the coolant flows to the cooling flow path R formed by the first and second cooling grooves 311-2 and 110-2, thereby cooling the stator assembly 100-2 similarly to the aforementioned FIG. 34.

Particularly, the first and second cooling grooves 311-2 and 110-2 have a technical merit in that a thickness T2 of the motor housing 310-2 may be reduced. That is, according to the present modified example, because a part of the cooling flow path R, that is, only the first cooling groove 311-2 is formed in the motor housing 310-2, the thickness T2 of the motor housing 310-2 may be reduced in comparison with the aforementioned exemplary embodiment. Therefore, consequently, a radial length of the motor is shortened.

In other words, the present modified example has a structure in which the cooling flow path 311-1 of the aforementioned exemplary embodiment is moved to the radial inner side toward the stator assembly 100-1. Therefore, even though the cooling flow path R having the same thickness is formed, the radial length of the present modified example may be shorter than the radial length of the aforementioned exemplary embodiment. Therefore, in a case of the present modified example, the entire radial length of the motor housing 310-2 may be shortened, thereby enabling implementation of a more compact motor.

Meanwhile, in a case of the present modified example, since the first and second cooling grooves 311-2 and 110-2, which have one surface opened, respectively, meet together so as to form the single cooling flow path R, there is a possibility that the coolant leaks due to a clearance between the inner circumferential surface of the motor housing 310-2 and the outer circumferential surface of the stator assembly 100-2. Therefore, in a case of the present modified example, the outer circumferential surface of the stator assembly 100-2 may be formed to come into close contact with the inner circumferential surface of the motor housing 310-2.

In addition, as necessary, a coolant sealing member 120-2 may be provided between the outer circumferential surface of the stator assembly 100-2 and the inner circumferential surface of the motor housing 310-2. The coolant sealing member 120-2 may include an O-ring member or the like, and prevents the coolant in the cooling flow path R from leaking to the outside. In addition, a pair of the coolant sealing members 120-2 may be provided in the front and rear direction thereof by interposing the cooling flow path R therebetween.

Furthermore, the stator assembly 100-2 may be provided with a sealing groove 130-2 in order to mount the coolant sealing member 120-2. The sealing groove 130-2 may be circumferentially formed along the outer circumferential surface of the stator assembly 100-2. In addition, a pair of the sealing grooves 130-2 may be provided in the front and rear direction thereof by interposing the second cooling groove 110-2 therebetween so as to correspond to the pair of the coolant sealing members 120-2.

Hereinafter, a support structure of the rotor assembly by the front cover and the rear cover will be described in more detail with reference to the drawings.

Figure 36:
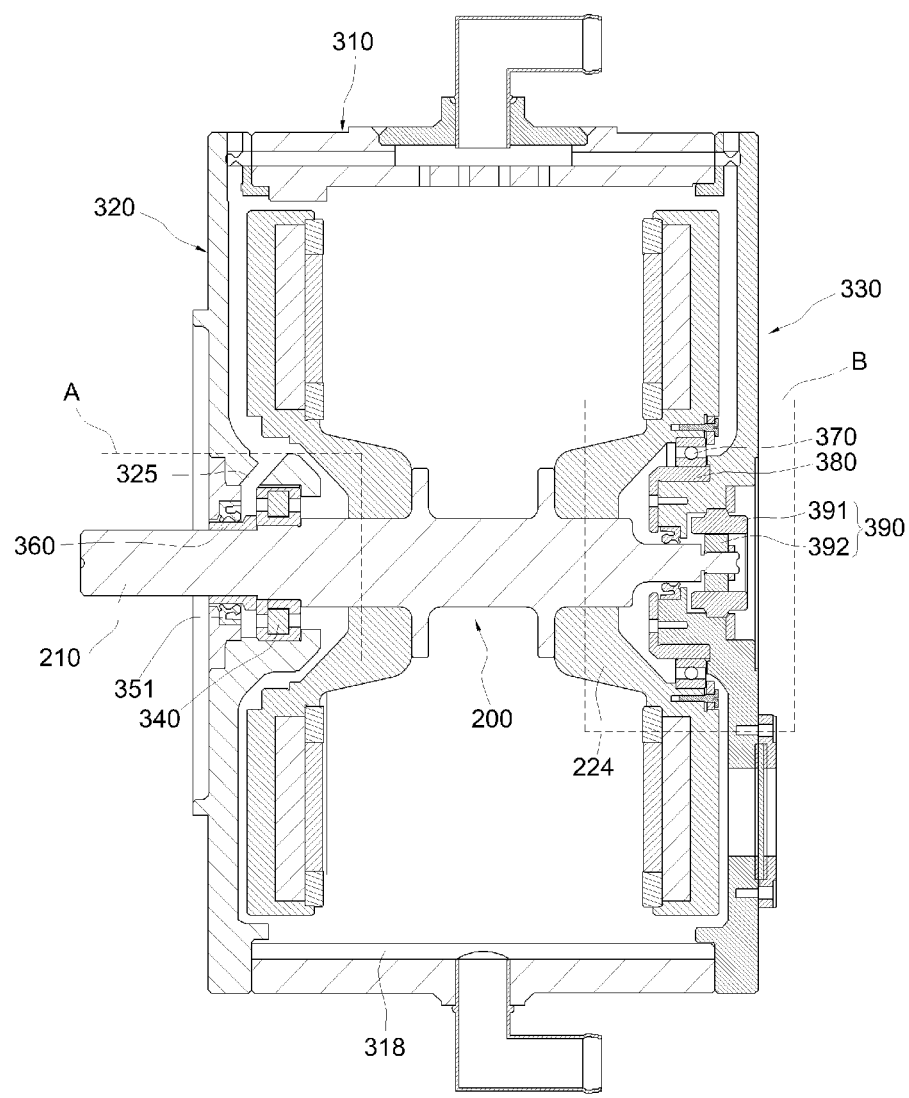
FIG. 36 is a side cross-sectional view illustrating a support structure of the rotor assembly by the front cover and the rear cover in the housing assembly according to the exemplary embodiment of the present invention.
Figure 37:
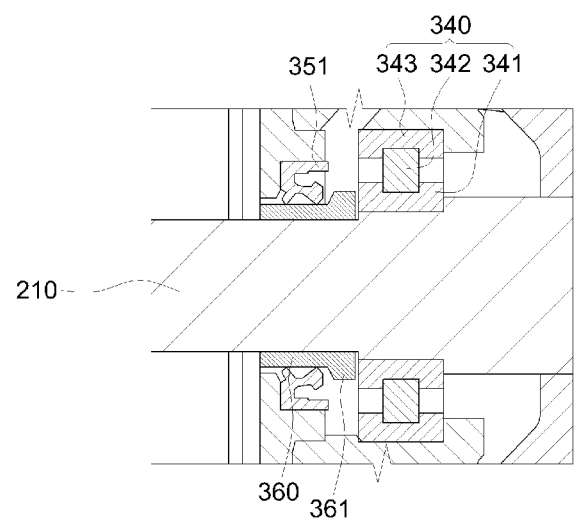
FIG. 37 is an enlarged view enlarging and illustrating part A depicted in FIG. 36.

FIG. 36 is a side cross-sectional view illustrating a support structure of the rotor assembly by the front cover and the rear cover in the housing assembly according to the exemplary embodiment of the present invention. FIG. 37 is an enlarged view enlarging and illustrating part A depicted in FIG. 36.

It is noted that for explanatory convenience, FIG. 37 illustrates a configuration on the basis of a support structure of the rotor assembly 200 while omitting partial components such as the stator assembly 100 and the like.

Referring to FIGS. 36 and 37, the front end portion of the rotor assembly 200 may be rotatably supported on the front cover 320 by a first bearing 340. The first bearing 340 may include a roller type bearing. In this case, the first bearing 340 may include a bearing inner race 341 mounted on an outer circumference of the shaft 210, a bearing outer race 343 mounted on the front cover 320, and rollers 342 interposed between the bearing inner race 341 and the bearing outer race 343. However, the first bearing 340 is not limited to a specific type of bearing as long as the first bearing 340 may support the shaft 210 to be rotatable.

Meanwhile, a first sealing member 351 may be provided on the front cover 320 so as to prevent the coolant for lubricating the first bearing 340 from leaking. The first sealing member 351 may prevent the coolant, which is supplied through the coolant flow hole 325 of the front cover 320, from leaking to the outside.

In addition, a bearing stopper 360 may be provided on the outer circumference of the shaft 210 in order to fix a position of the first bearing 340. The bearing stopper 360 may have a rear end on which a stepped portion 361 is formed, and the stepped portion 361 comes into contact with the first bearing 340 to prevent the first bearing 340 from being axially moved away.

Here, the aforementioned first sealing member 351 may be formed to come into contact with or come into close contact with an outer circumferential surface of the bearing stopper 360. In other words, the first sealing member 351 may be formed to come into contact with or come into close contact with the outer circumferential surface of the bearing stopper 360, not the outer circumferential surface of the shaft 210. The reason is for shortening an axial length of the motor by using in common the outer circumferential surface of the bearing stopper 360 as a contact surface for sealing.

Figure 38:
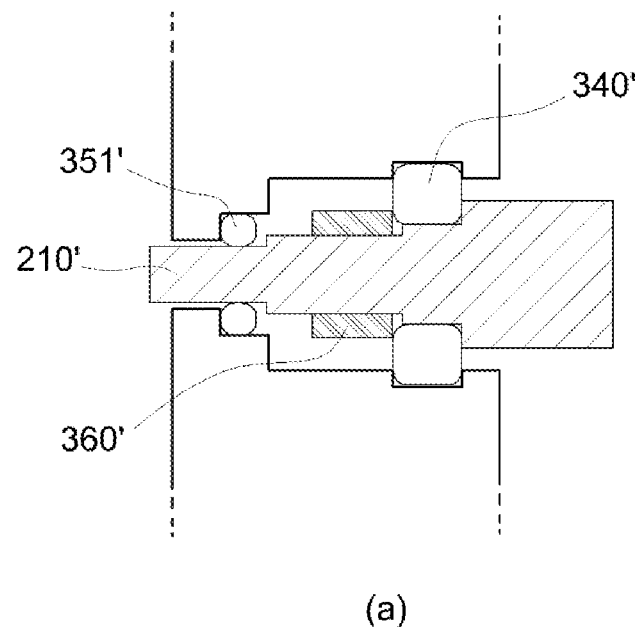
FIG. 38 is a conceptual view illustrating an effect of shortening an axial length of a motor, in a structure that positions a bearing stopper and a first sealing member according to the exemplary embodiment of the present invention.
Figure 38:
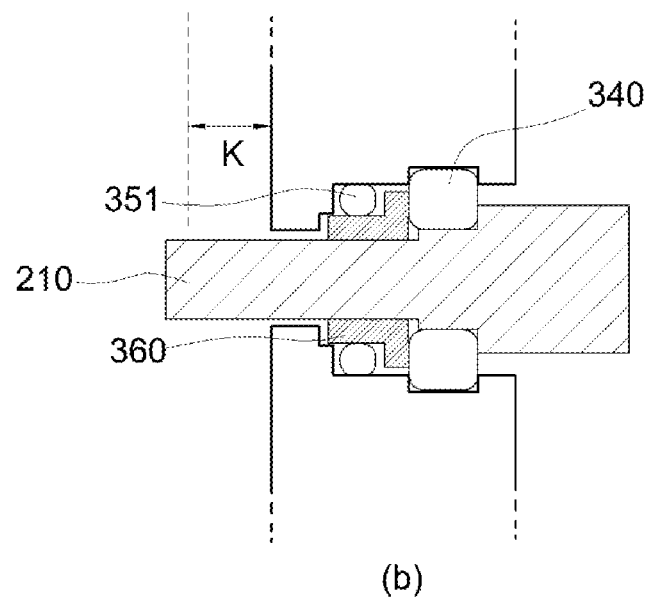

FIG. 38 is a conceptual view illustrating an effect of shortening an axial length of the motor, in a structure that positions the bearing stopper and the first sealing member according to the exemplary embodiment of the present invention.

FIG. 38(a) conceptually illustrates a structure that positions a bearing stopper 360' and a sealing member 351' according to the related art, and it can be seen that in a general case in the related art, the sealing member 351' is separately disposed at a front end of the bearing stopper 360'. That is, it can be seen that the sealing member 351' is disposed in a structure in which the sealing member 351' comes into direct contact with the shaft 210', and the bearing stopper 360' for preventing a bearing 340' from being axially moved away is separately disposed at a rear end of the sealing member 351'.

In the general structure of the related art as described above, because an axial mounting space is separately required to mount the sealing member 351' or the bearing stopper 360', there is a technical limitation in shortening an axial length of the motor.

FIG. 38(b) conceptually illustrates a structure that positions the bearing stopper 360 and the first sealing member 351 according to the exemplary embodiment of the present invention, and it can be seen that the first sealing member 351 comes into contact with the bearing stopper 360 instead of the shaft 210 in order to reduce an axial mounting space for mounting the first sealing member 351. That is, the bearing stopper 360 according to the present exemplary embodiment has both a function as a stopper that prevents the first bearing 340 from being axially moved away, and a function of providing a contact space of the first sealing member 351.

Therefore, as illustrated in FIG. 38, because an axial mounting space K, which is needed to mount the sealing member 351' of the related art, is not required, the axial length of the motor may be shortened.

Figure 39:
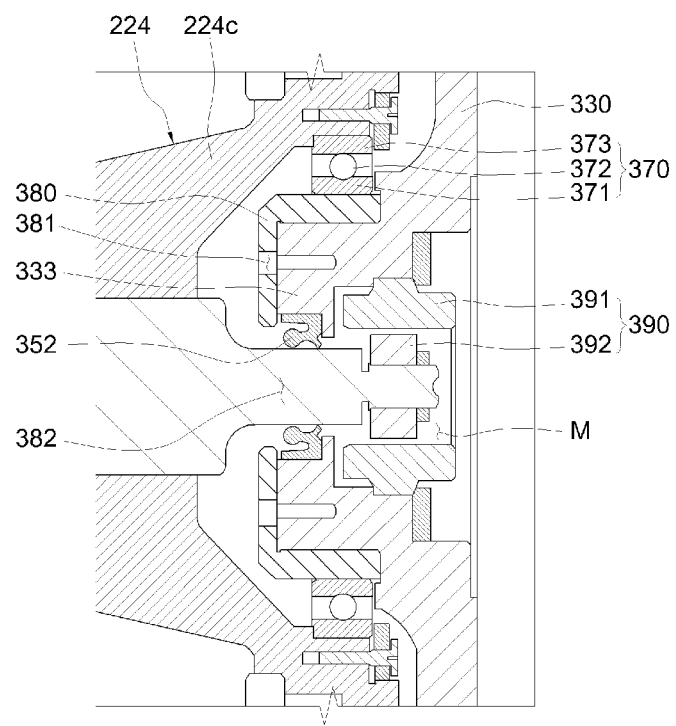
FIG. 39 is an enlarged view enlarging and illustrating part B depicted in FIG. 36.

FIG. 39 is an enlarged view enlarging and illustrating part B depicted in FIG. 36.

Referring to FIG. 39, the rear end portion of the rotor assembly 200 may be rotatably supported on the rear cover 330 by a second bearing 370. The second bearing 370 may include a ball type bearing. In this case, the second bearing 370 may include a bearing outer race 373 fastened to the rotor assembly 200, a bearing inner race 371 fastened to the rear cover 330, and balls 372 interposed between the bearing outer race 373 and the bearing inner race 371. However, the second bearing 370 is not limited to a specific type of bearing as long as the second bearing 370 may support the rotor assembly 200 to be rotatable.

Meanwhile, unlike the first bearing 340 that is directly fastened to the shaft 210 of the rotor assembly 200, the second bearing 370 may be fastened to the rotating disk 224 of the rotor assembly 200. More specifically, the bearing outer race 373 of the second bearing 370 may be fastened to the inner side of the protruding portion 224c of the rotating disk 224 so as to be supported by the rotating disk 224. In addition, the bearing inner race 341 of the second bearing 370 may be fastened to a bearing supporter 380, which is provided on the rear cover 330, so as to be supported by the rear cover 330. This structure of the second bearing 370 may secure a space for mounting a resolver 390 at an inner circumferential side of the second bearing 370. Therefore, the axial length of the motor may be shortened in comparison with a case in which the second bearing 370 and the resolver 390 are disposed axially side by side. A description thereof will be amplified with reference to FIG. 41.

The bearing supporter 380 may be provided on the rear cover 330 in order to support the second bearing 370. The bearing supporter 380 prevents damage to the second bearing 370 due to thermal expansion of the rear cover 330.

More specifically, the rear cover 330 may be made of an aluminum material, and in this case, thermal expansion of the rear cover 330 may occur due to material property. When the thermal expansion of the rear cover 330 occurs, external force may radially and outwardly applied to the bearing inner race 371 supported on the rear cover 330, and hereby, problems may occur in that the second bearing 370 is pressed and damaged, or a lifespan thereof is shortened.

Figure 40:
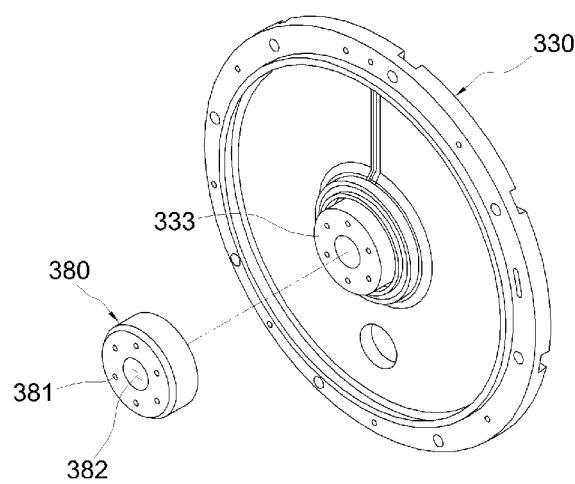
FIG. 40 is a perspective view illustrating a bearing supporter according to the exemplary embodiment of the present invention.

FIG. 40 is a perspective view illustrating a bearing supporter according to the exemplary embodiment of the present invention.

Referring to FIG. 40, the bearing supporter 380 is provided to resolve the aforementioned problem, and fastened to the protruding portion 333 of the rear cover 330 so as to be interposed between the bearing inner race 371 of the second bearing 370 and the protruding portion 333 of the rear cover 330. Here, the bearing supporter 380 is made of a material having a coefficient of thermal expansion smaller than that of the material of the rear cover 330 so as to suppress the thermal expansion of the rear cover 330, and prevent the second bearing 370 from being pressed. For example, the bearing supporter 380 may include stainless steel.

Meanwhile, the bearing supporter 380 may be formed as a cap shaped member that covers the protruding portion 333 of the rear cover 330, and may be provide with an assembly hole 381 at one side surface thereof in order to be fastened to the rear cover 330. In addition, the bearing supporter 380 may be provided with a shaft through hole 382 at a central portion thereof so that the shaft 210 may penetrate the shaft through hole 382.

The rear cover 330 may be provided with a second sealing member 352 in order to prevent the coolant, which is supplied to the second bearing 370 through the coolant flow groove 332, from leaking to the outside. The second sealing member 352 may be mounted on the inner circumferential side of the protruding portion 333 so as to come into contract with the outer circumferential surface of the shaft 210. Here, the aforementioned bearing supporter 380 may be used as a means for preventing the second sealing member 352 from being axially moved away. That is, as illustrated in FIG. 39, an inner diameter of the bearing supporter 380 is predeterminedly smaller than an outer diameter of the second sealing member 352 such that a part of the inner diameter side of the bearing supporter 380 may be formed to come into contact with the second sealing member 352. In this case, the second sealing member 352 comes into contact with the bearing supporter 380, thereby preventing the second sealing member 352 from being axially (that is, toward the left side of FIG. 39) moved away.

Meanwhile, the resolver 390 may be provided on the rear end portion of the shaft 210. The resolver 390 is provided to detect a rotational speed, a rotational position, and the like of the shaft 210, and may include a resolver stator 391, and a resolver rotor 392.

The resolver rotor 392 is mounted on the rear end portion of the shaft 210 so as to be rotated together with the shaft 210. The resolver stator 391 may be fixed and installed on the rear cover 330. The resolver stator 391 and the resolver rotor 392 have two-phase wound coil, respectively, and detect a rotational speed, a rotational position, and the like of the shaft 210 through variations in output voltage values.

Here, the resolver 390 may be mounted in a space inside the protruding portion 333. Alternatively, the resolver 390 may be disposed at an inner circumferential side of the second bearing 370. This mounting structure of the resolver 390 may shorten the axial length of the motor.

More specifically, the protruding portion 333 provided on the rear cover 330 may predeterminedly protrude toward the inner side of the motor housing 310 so as to form therein a mounting space M having a predetermined size. The rear end portion of the shaft 210 may be disposed in the mounting space M through the shaft through hole 382 of the bearing supporter 380. Here, the resolver rotor 392 may be fastened to the rear end portion of the shaft 210, which is disposed in the mounting space M, and the resolver stator 391 may be fastened to the rear cover 330 while being spaced apart from the outer circumferential side of the resolver rotor 392 at a predetermined interval.

This disposition of the resolver 390 may prevent the axial length of the motor from being increased. In other words, because the resolver 390 is disposed in the mounting space M at the inner side of the protruding portion 333, an increase in axial length due to mounting of the resolver 390 may be prevented.

Figure 41:
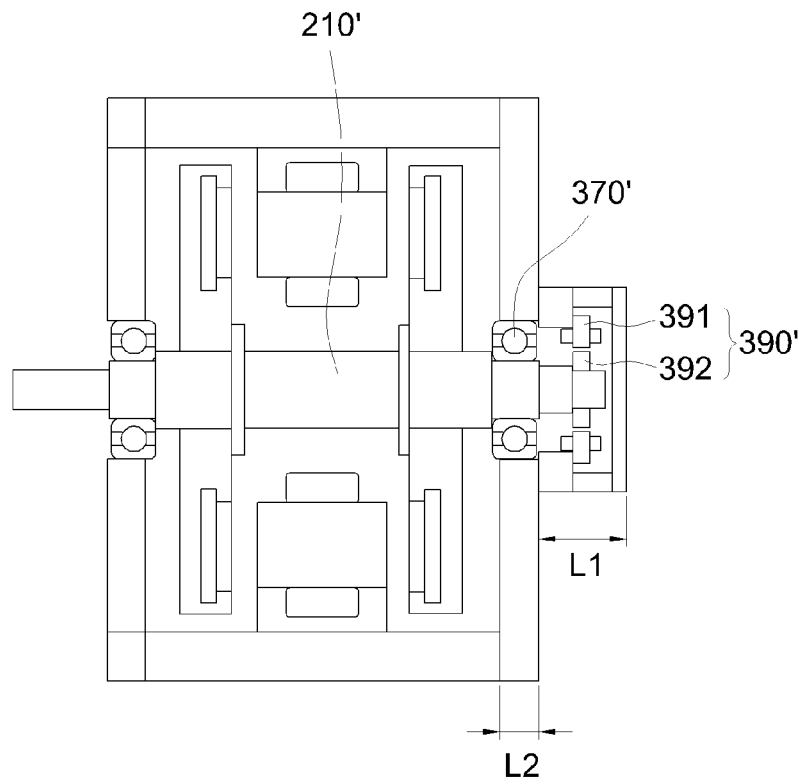
FIG. 41 is a conceptual view illustrating an effect of shortening an axial length of the motor, in a resolver mounting structure according to the exemplary embodiment of the present invention.
Figure 41:
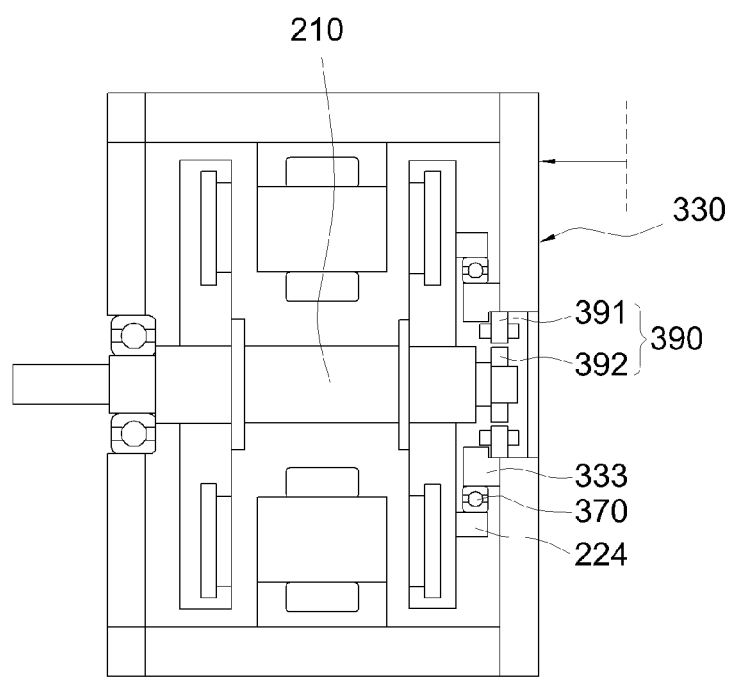

FIG. 41 is a conceptual view illustrating an effect of shortening an axial length of the motor, in a resolver mounting structure according to the exemplary embodiment of the present invention.

It is noted that FIG. 41(a) conceptually illustrates a general resolver mounting structure, and FIG. 41(b) conceptually illustrates a resolver mounting structure according to the present exemplary embodiment.

First, referring to FIG. 41(a), in a general case, a resolver 390' is mounted axially and side by side with a bearing 370' for rotatably supporting a shaft 210'. In this case, an axial mounting space is required to mount the resolver 390' and the bearing 370'. In other words, a first axial mounting space L1 is required to mount the resolver 390', and a second axial mounting space L2 is required to mount the bearing 370'. In addition, since the resolver 390' and the bearing 370' are disposed axially and side by side, consequently, an axial mounting space made by adding the first and second mounting spaces L1 and L2 is required in order to mount the resolver 390' and the bearing 370'.

In contrast, referring to FIG. 41(b), in a case of the present exemplary embodiment, the resolver 390 may be disposed inside the motor housing 310. That is, in comparison with the aforementioned FIG. 41(a), in a case of the present exemplary embodiment, the resolver 390 is disposed in a space in which the bearing 370' was mounted.

In addition, in a case of the present exemplary embodiment, the second bearing 370 for supporting the rotor assembly 200 is disposed at the outer circumferential side of the resolver 390. That is, as described above, the second bearing 370 is interposed between the protruding portion 333 of the rear cover 330 and the rotating disk 224 of the rotor assembly 200 so as to support the rotor assembly 200 to be rotatable.

Therefore, in a case of the present exemplary embodiment, the resolver 390 and the second bearing 370 share the axial mounting space, and hereby, the axial length of the motor may be shortened. That is, when comparing FIGS. 41(a) and (b), as the resolver 390 enters inside the motor housing 310 in FIG. 41(b), the first mounting space L1, which was required to mount the resolver 390' in FIG. 41(a), is not required.

Although the exemplary embodiments of the present invention have been described above, the present invention may be changed and altered in various manners by a person skilled in the art by adding, altering or deleting elements without departing from the spirit of the invention recited in the claims, and such changes and alterations should be understood to fall within the scope of the present invention.

What is claimed is:

1. An axial flux permanent magnet motor, comprising:
   a stator assembly configured to produce magnetic flux in a direction of a rotational axis;
   a rotor assembly;
   a housing assembly comprising a motor housing in which the stator assembly is accommodated;
   a coolant inlet portion of the motor housing;
   a coolant outlet portion of the motor housing;
   a first cooling groove provided in an inner circumferential surface of the motor housing;
   a second cooling groove, which corresponds to the first cooling groove, provided in an outer circumferential surface of the stator assembly; and
   a third cooling groove provided in an inner axial surface of the motor housing,
   wherein the first and second cooling grooves meet together to form a first cooling flow path which meets with the coolant inlet portion,
   wherein the third cooling groove and the rotor assembly meet together to form a second cooling flow path to provide a flow of a coolant from the coolant inlet portion and the first cooling flow path to the coolant outlet portion, and
   wherein the coolant inlet portion and the coolant outlet portion are located at opposite sides of the motor housing.

2. The axial flux permanent magnet motor of claim 1, wherein the first cooling groove is formed in the inner circumferential surface of the motor housing and extends circumferentially, and the second cooling groove is formed in the outer circumferential surface of the stator assembly and extends circumferentially so as to correspond to the first cooling groove.

3. The axial flux permanent magnet motor of claim 1, wherein the stator assembly comprises a resin part in which core-bobbin units are impregnated, fixed and supported, and the second cooling groove is formed in an outer circumferential surface of the resin part.

4. The axial flux permanent magnet motor of claim 3, wherein the resin part is manufactured by circumferentially disposing the core-bobbin units in a mold, and performing an insert injection molding method.

5. The axial flux permanent magnet motor of claim 3, wherein the resin part is formed of electrical insulating resin.

6. The axial flux permanent magnet motor of claim 3, wherein the core-bobbin unit comprises a stator core, and a bobbin to which the stator core is inserted and fastened, the bobbin comprises a body portion in which the stator core is accommodated, and flange portions provided at both end portions of the body portion, and a first stepped portion is provided at one side portion of the flange portion, and a second stepped portion is provided at the other side portion thereof.

7. The axial flux permanent magnet motor of claim 6, wherein the first stepped portion is formed at one surface of the flange portion, and the second stepped portion is formed at the opposite surface to the one surface thereof.

8. The axial flux permanent magnet motor of claim 1, wherein the outer circumferential surface of the stator assembly is closely fastened to the inner circumferential surface of the motor housing so as to prevent the coolant in the cooling flow path from leaking.

9. The axial flux permanent magnet motor of claim 1, wherein a pair of coolant sealing members is provided by interposing the cooling flow path therebetween so as to prevent the coolant in the cooling flow path from leaking, and the coolant sealing members are mounted on at least one of the inner circumferential surface of the motor housing or the outer circumferential surface of the stator assembly so as to be interposed between the inner circumferential surface of the motor housing and the outer circumferential surface of the stator assembly.

10. The axial flux permanent magnet motor of claim 9, wherein a pair of sealing grooves, in which the pair of coolant sealing members is mounted, is provided in the outer circumferential surface of the stator assembly by interposing the second cooling groove therebetween.

11. The axial flux permanent magnet motor of claim 1, wherein the motor housing further comprises a coolant collection groove disposed at a radially inner portion of the third cooling groove.

12. The axial flux permanent magnet motor of claim 1, wherein the motor housing further comprises a coolant draining groove, extending the axial length of the housing portion, to provide a flow of the coolant from the second cooling flow path to the coolant outlet portion.

* * * * *